(12) United States Patent
Ko et al.

(10) Patent No.: US 12,137,314 B2
(45) Date of Patent: Nov. 5, 2024

(54) TERMINAL FOR CONTROLLING WIRELESS SOUND DEVICE, AND METHOD THEREFOR

(71) Applicant: LG ELECTRONICS INC., Seoul (KR)

(72) Inventors: Kyoungsuk Ko, Seoul (KR); Sungwook Lee, Seoul (KR); Byungjin Kim, Seoul (KR); Taegil Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 17/787,098

(22) PCT Filed: Jul. 14, 2020

(86) PCT No.: PCT/KR2020/009255
§ 371 (c)(1),
(2) Date: Jun. 17, 2022

(87) PCT Pub. No.: WO2022/014734
PCT Pub. Date: Jan. 20, 2022

(65) Prior Publication Data
US 2023/0024547 A1    Jan. 26, 2023

(51) Int. Cl.
*H04R 1/10* (2006.01)

(52) U.S. Cl.
CPC ....... *H04R 1/1041* (2013.01); *H04R 2420/07* (2013.01)

(58) Field of Classification Search
CPC .................................................... H04R 1/1041
See application file for complete search history.

(56) References Cited

U.S. PATENT DOCUMENTS

| 2010/0159833 A1 | 6/2010 | Lewis et al. |
| 2016/0357510 A1 | 12/2016 | Watson et al. |
| 2017/0230754 A1 | 8/2017 | Dusan |
| 2018/0279038 A1 | 9/2018 | Boesen |

(Continued)

FOREIGN PATENT DOCUMENTS

| KR | 10-2018-0039339 A | 4/2018 |
| KR | 10-2019-0044703 A | 4/2019 |
| WO | WO 2016/196838 A1 | 12/2016 |

*Primary Examiner* — Simon King
(74) *Attorney, Agent, or Firm* — Birch, Stewart, Kolasch & Birch, LLP

(57) ABSTRACT

A terminal for controlling a wireless sound device can include a communication interface configured to wirelessly connect to at least one or more wireless sound devices; and a processor configured to transmit and receive a positioning signal to and from the at least one or more wireless sound devices, determine a relative position of the at least one or more wireless sound devices based on the positioning signal, receive an acceleration sensor value from the at least one or more wireless sound devices, determine a posture of the at least one or more wireless sound devices based on the acceleration sensor value, determine a wearing state of the at least one or more wireless sound devices based on the relative position and the posture of the at least one or more wireless sound devices, and transmit an audio signal to a worn wireless sound device among the wireless sound devices.

18 Claims, 19 Drawing Sheets

(56) References Cited

U.S. PATENT DOCUMENTS

| | | |
|---|---|---|
| 2018/0367882 A1 | 12/2018 | Watts et al. |
| 2020/0103513 A1 | 4/2020 | Knaappila |
| 2020/0145757 A1* | 5/2020 | Kraemer ................ H04R 29/00 |
| 2021/0377648 A1* | 12/2021 | Tome ................... H04R 1/1016 |

* cited by examiner

FIG. 5
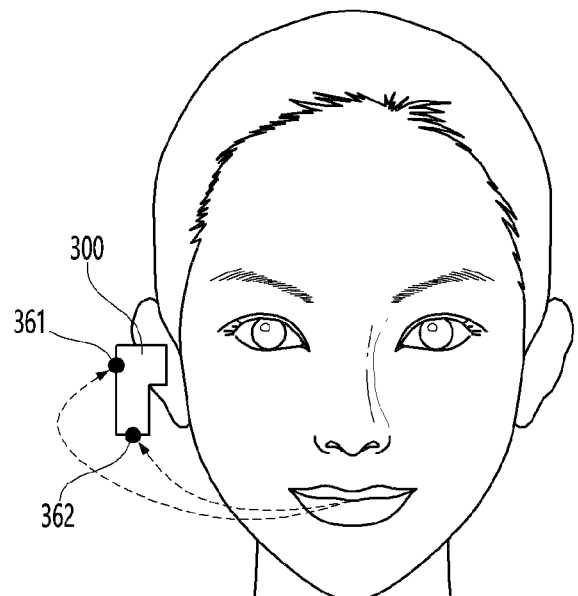
(a)
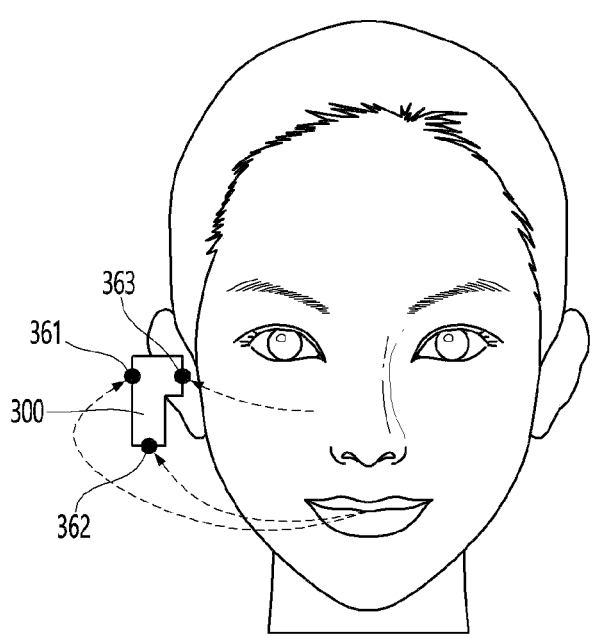
(b)

FIG. 9
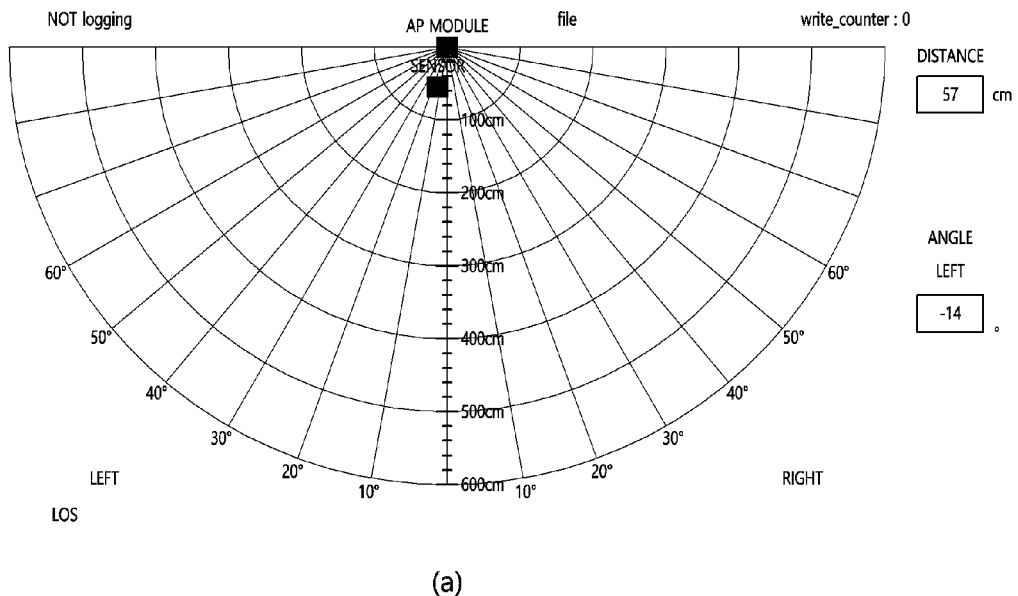
(a)
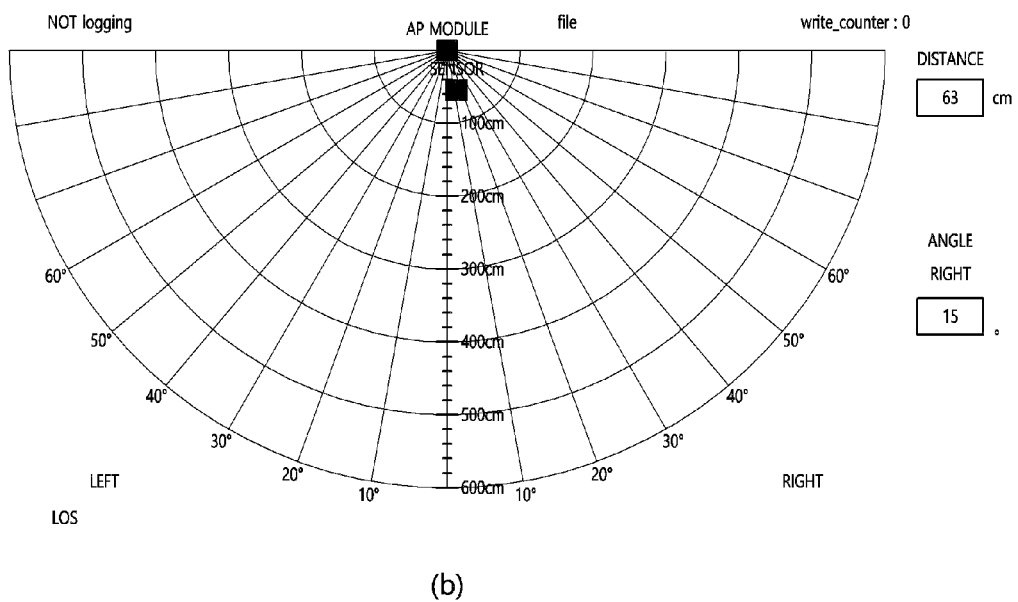
(b)

FIG. 11
(a) 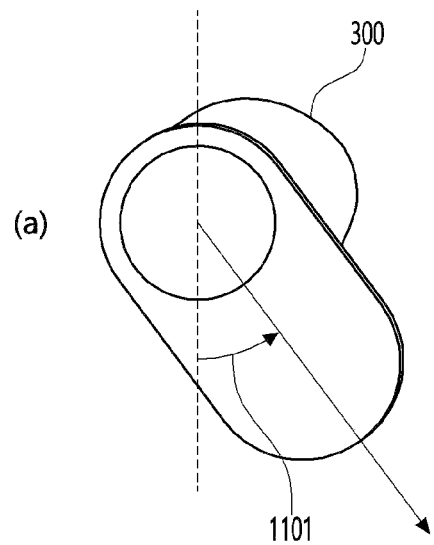
1101
(b) 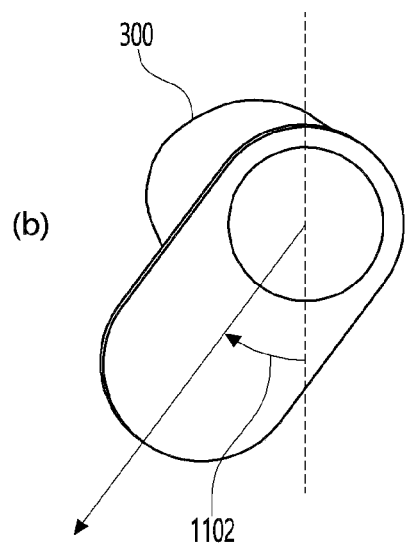
1102

TERMINAL FOR CONTROLLING WIRELESS SOUND DEVICE, AND METHOD THEREFOR

CROSS-REFERENCE TO RELATED APPLICATION

This application is the National Phase of PCT International Application No. PCT/KR2020/009255, filed on Jul. 14, 2020, the entire contents of which are hereby expressly incorporated by reference into the present application.

BACKGROUND OF THE DISCLOSURE

Technical Field

The present disclosure relates to a terminal and method for controlling a wireless sound device through wireless communication.

Related Art

A wireless sound device refers to a device that receives a sound signal from a terminal through wireless communication and outputs a sound corresponding to the received sound signal. Recently, with the development of wireless communication technology, the demand and supply of wireless sound devices are increasing significantly in terms of portability and convenience, compared to wired sound devices.

However, due to the increase in the portability of these wireless sound devices, situation in which both sound output units are worn in reverse manner (e.g., earbuds inserted into the wrong ears) or are lost has increased. In addition, the wireless sound device has a built-in battery that can limit the use time, so that there is a need to reduce unnecessary battery consumption of the wireless sound device, unlike the wired sound device.

SUMMARY OF THE DISCLOSURE

Technical Problem

An object of the present disclosure is to provide a method for controlling a wireless sound device that guides a user to wear the wireless sound device in correct manner.

Another object of the present disclosure is to provide a method for controlling a wireless sound device that adjusts an output channel of the wireless sound device or cuts off the power of the wireless sound device based on a state in which a user wears the wireless sound device.

Technical Solution

An embodiment of the present disclosure provides a terminal that connects to at least one or more wireless sound devices, transmits and receives a positioning signal to and from a connected wireless sound device to determine a relative position, determine a posture of the connected wireless sound device based on an acceleration sensor value received from the connected wireless sound device, determine a wearing state of the connected wireless sound device based on the relative position and posture of the connected wireless sound device, and transmit an audio signal to the worn wireless sound device among the connected wireless sound devices and a method therefor.

In this situation, the relative position of the wireless sound device can be determined by measuring the angle of arrival and the time of flight of the positioning signal transmitted and received using at least two or more communication modules (e.g., two or more transceivers, such as transceiver 1 and transceiver 2, in FIG. 7).

When a plurality of wireless sound devices are connected, the terminal can calculate the distance between the connected plurality of wireless sound devices based on a direction and a distance of each of the connected plurality of wireless sound devices.

In this situation, the terminal can determine the wearing state of the connected wireless sound device based on at least one of the distance to each of the connected wireless sound devices, the direction of each of the connected wireless sound devices, the posture of each of the connected wireless sound devices, or the distance between the connected wireless sound devices.

The terminal can cut off power to an unworn wireless sound device among the connected wireless sound devices, disconnect the unworn wireless sound device, or prevent an output audio channel from being assigned to the unworn wireless sound device.

In this situation, the terminal can determine an output audio channel corresponding to the worn wireless sound device in consideration of the wearing direction of the worn wireless sound device, and transmit an audio signal corresponding to the determined output audio channel to the worn wireless sound device.

The terminal can determine an output audio channel of the first wireless sound device as an audio channel corresponding to the wearing direction of the first wireless sound device, and determine an output audio channel of the second wireless sound device as an audio channel corresponding to the wearing direction of the second wireless sound device when it is determined that both the first wireless sound device and the second wireless sound device are worn by one user.

The terminal can determine an output audio channel of a worn wireless sound device among the first wireless sound device and the second wireless sound device as a mono channel when it is determined that the first wireless sound device and the second wireless sound device are worn by two different users respectively, or only one of the first wireless sound device and the second wireless sound device is worn by one user.

Advantageous Effects of the Invention

According to various embodiments of the present disclosure, it is possible to guide a user on a correct way to wear the wireless sound device when the user wears the wireless sound device in a wrong direction (e.g., when having placed earbuds in the wrong ears).

Further, according to various embodiments of the present disclosure, it is possible to output a sound according to the wearing direction of the wireless sound device even when the user wears the wireless sound device in the opposite direction.

Further, according to various embodiments of the present disclosure, it is possible to reduce unnecessary power consumption by preventing sound from outputting from a wireless sound device that is not currently being worn by the user.

BRIEF DESCRIPTION OF THE DRAWINGS

The above and other objects, features and advantages of the present disclosure will be more apparent from the following detailed description in conjunction with the accompanying drawings.

FIG. 5, including parts (a) and (b), is a diagram illustrating a method for collecting a user's spoken voice using a wireless sound device according to various embodiments of the present disclosure.

FIG. 9, including parts (a) and (b), is a diagram illustrating a result of calculating the relative locations of two wireless sound devices using a terminal according to an embodiment of the present disclosure.

FIG. 11, including parts (a) and (b), is a diagram showing a posture of a wireless sound device according to an embodiment of the present disclosure.

DETAILED DESCRIPTION OF THE EMBODIMENTS

Figure 1:
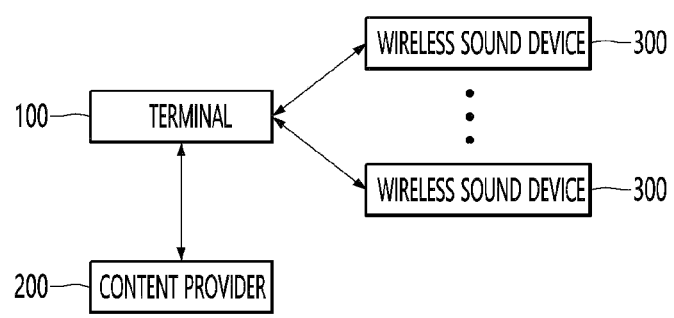
FIG. 1 is a diagram illustrating a sound output system according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. The suffixes "module" and "unit or portion" for components used in the following description are merely provided only for facilitation of preparing this specification, and thus they are not granted a specific meaning or function. In addition, when it is determined that the detailed description of the related known technology may obscure the gist of embodiments disclosed herein in describing the embodiments, a detailed description thereof will be omitted. Further, the accompanying drawings are intended to facilitate understanding of the embodiments disclosed herein, and the technical spirit disclosed herein are not limited by the accompanying drawings. Therefore, the present disclosure should be construed as including all the changes, equivalents, and substitutions included in the spirit and scope of the present disclosure.

The terms coming with ordinal numbers such as "first," "second," or the like can be used to denote various components, but the components are not limited by the terms. The terms are used merely for the purpose to distinguish a component from the other component.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The AI device 100 can be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

FIG. 1 is a diagram illustrating a sound output system according to an embodiment of the present disclosure.

Referring to FIG. 1, a sound output system can include a terminal 100, a content provider 200, and at least one wireless sound device 300 or more.

The terminal 100 can refer to a device that connects to the wireless sound device 300 using a wireless communication technology, outputs sound through the wireless sound device 300, and controls the wireless sound device 300. The terminal 100 can be considered as an audio signal providing device in that the terminal 100 provides an audio signal to the wireless sound device 300.

The terminal 100 can simultaneously output sound through one or more wireless sound devices 300 (e.g., earbud headphones). For example, the terminal 100 can output multi-channel sound by transmitting audio signals of different channels to the wireless sound devices 300, respectively.

The terminal 100 can transmit and receive a pairing signal, a positioning signal, an audio signal, and the like, with the wireless sound device 300 using the wireless communication technology. The pairing signal can mean a signal transmitted and received to connect the wireless sound device 300 to the terminal 100. The positioning signal can mean a signal transmitted and received to measure a relative location between the terminal 100 and the wireless sound device 300. The audio signal can refer to a signal transmitted to the wireless sound device 300 by the terminal 100 to output sound through the wireless sound device 300.

The terminal 100 can receive content data including audio data from the content provider 200 using wired/wireless communication technology, and transmit an audio signal corresponding to the received audio data to the wireless sound device 300. Alternatively, the terminal 100 can transmit an audio signal corresponding to audio data stored in the memory 170 to the wireless sound device 300.

The wireless sound device 300 can be connected to the terminal 100 using the wireless communication technology, and can output a sound based on an audio signal received from the terminal 100. To this end, the wireless sound device 300 can include at least one sound output unit or speaker.

The wireless sound device 300 can include one or more sound output units 340, and can output sounds of the same channel or output sounds of different channels through the sound output units 340. For example, the wireless sound device 300 can include two sound output units, such as headphones or neckband type earphones or earbud type headphones and, in this situation, the wireless sound device 300 can output a left channel sound and a right channel sound through the sound output units, respectively.

A plurality of wireless sound devices 300 can operate as one group, and such a group of wireless sound devices can operate as one wireless sound device including a plurality of sound output units. For example, even when the two wireless sound devices 300 each include one sound output unit, one of the two wireless sound devices 300 can output a left channel sound corresponding to the left channel audio signal, and the other can output a right channel sound corresponding to the right channel audio signal (e.g., for the left and right ears of a user).

In an embodiment, when the plurality of wireless sound devices 300 operate as a group, one wireless sound device can function as a master wireless sound device, and the other wireless sound devices can function as slave wireless sound device. In this situation, even when the terminal 100 is connected only to the master wireless sound device, the slave wireless sound devices can also output sound through the master wireless sound device. Further, the terminal 100 can connect to the slave wireless sound device through the master wireless sound device and output sound through the slave sound device.

In an embodiment, when the plurality of wireless sound devices 300 operate as a group, the terminal 100 can connect to all of the wireless sound devices 300 and individually transmit an audio signal to each wireless sound device 300 to output sound.

The content provider 200 can provide video content data, audio content data, or the like to the terminal 100 using the wired/wireless communication technology. The video content data or audio content data can include audio data.

The content provider 200 can refer to various content providing devices such as a radio base station, a terrestrial base station, a broadcast satellite, a content data server, or the like.

Figure 2:
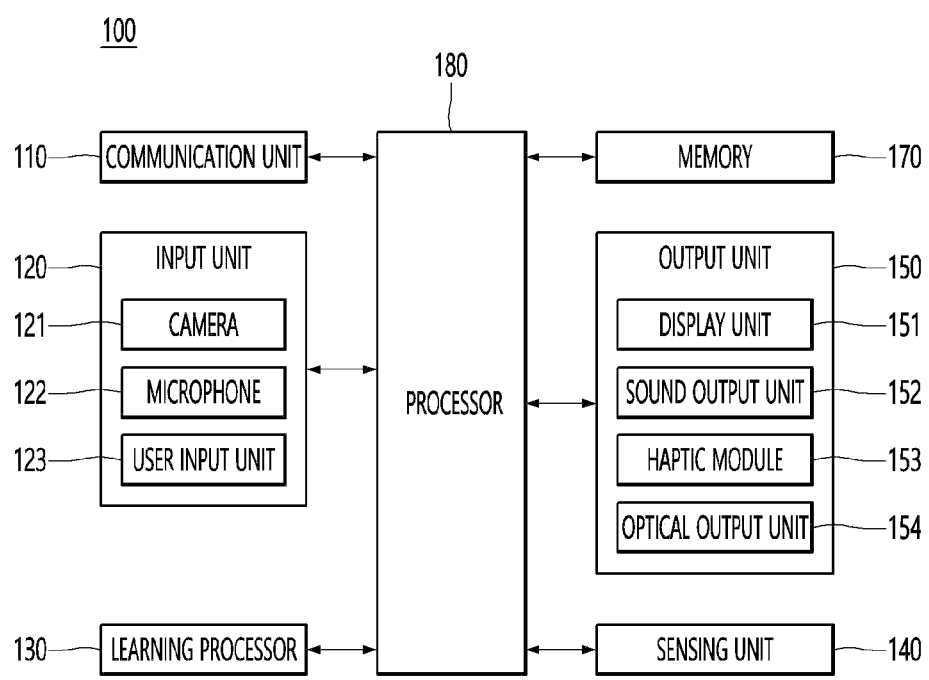
FIG. 2 is a block diagram illustrating a terminal for controlling a wireless sound device according to an embodiment of the present disclosure.

FIG. 2 is a block diagram illustrating a terminal 100 for controlling a wireless sound device according to an embodiment of the present disclosure.

Referring to FIG. 2, the AI device 100 can include a communication unit 110 (e.g., a communication interface, or communication transceiver), an input unit 120, a learning processor 130, a sensing unit 140, an output unit 150, a memory 170, and a processor 180.

The communication unit 110 can also be referred to as a communication modem or a communication circuit.

The communication unit 110 can transmit/receive data to and from external devices such as the wireless sound devices 300 using wired/wireless communication technology. For example, the communication unit 110 can transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), BLUETOOTH, RFID (Radio Frequency Identification), Infrared Data Association (IrDA), ZIGBEE, NFC (Near Field Communication), and the like.

The input unit 120 can be referred to as an input interface.

The input unit 120 can acquire various kinds of data.

The input unit 120 can include a camera 121 for inputting an image signal, a microphone 122 for receiving an audio signal, a user input unit 123 for receiving information from a user, and the like. Here, by considering the camera 121 or the microphone 122 as a sensor, a signal acquired from the camera 121 or the microphone 122 can be referred to as sensing data or sensor information.

The voice data or image data collected by the input unit 120 can be analyzed and processed as a control command of the user.

The input unit 120 can acquire a learning data for model learning and an input data to be used when an output is acquired by using learning model. The input unit 120 can acquire raw input data. In this situation, the processor 180 or the learning processor 130 can extract an input feature by preprocessing the input data.

The camera 121 processes image frames such as still images or moving images obtained by an image sensor in a video call mode or a photographing mode. The processed image frames can be displayed on the display unit 151 or stored in the memory 170.

The microphone 122 processes external sound signals as electrical speech data. The processed speech data can be utilized in various ways according to a function (or a running application program) being performed in the terminal 100. Meanwhile, various noise reduction algorithms can be applied in the microphone 122 to remove noise occurring in the process of receiving an external sound signal.

The user input unit 123 is for receiving information from a user. When information is input through the user input unit 123, the processor 180 can control the operation of the terminal 100 to correspond to the input information when the information is inputted through the user input unit 123.

The user input unit 123 can include mechanical input means (e.g., a button, a dome switch, a jog wheel, or a jog switch located at the front/rear or side of the terminal 100) and touch input means. As an example, the touch input means can include a virtual key, a soft key, or a visual key displayed on the touch screen through software processing, or a touch key disposed in the other portion than the touch screen.

The learning processor 130 can learn a model composed of an artificial neural network by using learning data. The learned artificial neural network can be referred to as a learning model. The learning model can be used to an infer result value for new input data rather than learning data, and the inferred value can be used as a basis for determination to perform a certain operation.

In this situation, the learning processor 130 can perform AI processing together with a learning processor of an artificial intelligence server.

The learning processor 130 can include a memory integrated or implemented in the terminal 100. Alternatively, the learning processor 130 can be implemented by using the memory 170, an external memory directly connected to the terminal 100, or a memory held in an external device.

The sensing unit 140 can be referred to as a sensor unit or a sensor.

The sensing unit 140 can acquire at least one of internal information about the terminal 100, ambient environment information about the terminal 100, and user information by using various sensors.

Examples of the sensors included in the sensing unit 140 can include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 can be referred to as an output interface.

The output unit 150 can generate an output related to a visual sense, an auditory sense, or a haptic sense. The output unit 150 can include at least one of a display unit 151, a sound output unit 152, a haptic module 153, and an optical output unit 154.

The display 151 displays (outputs) information processed by the terminal 100. For example, the display unit 151 can display execution screen information of an application program running on the terminal 100, or UI (User Interface) or Graphic User Interface (GUI) information according to the execution screen information.

The display unit 151 can implement a touch screen in such a manner that the display unit 151 forms a layer structure with or is integrally formed with a touch sensor. Such a touch screen can function as a user input unit 123 that provides an input interface between the terminal 100 and the user and can provide an output interface between the terminal 100 and the user at the same time.

The sound output unit 152 can output audio data received from the communication unit 110 or stored in the memory 170 in call signal reception, a call mode or a recording mode, a speech recognition mode, a broadcast reception mode, or the like. The sound output unit 152 can include at least one of a receiver, a speaker, and a buzzer.

The haptic module 153 generates various tactile effects that a user is able to feel. A representative example of the tactile effect generated by the haptic module 153 can be vibration.

The optical output unit 154 outputs a signal for notifying occurrence of an event by using light of a light source of the terminal 100. Examples of events generated by the terminal 100 can include message reception, call signal reception, a missed call, an alarm, schedule notification, email reception, and information reception through an application, and the like.

The memory 170 can store data that supports various functions of the terminal 100. For example, the memory 170 can store input data acquired by the input unit 120, learning data, a learning model, a learning history, and the like.

The processor 180 can control the overall operation of the terminal 100.

Image signals that are image-processed in the processor 180 can be input to the display unit 151 and displayed as an image corresponding to corresponding image signals. Additionally, the image signals that are image-processed in the processor 180 can be input to an external output device through an external device interface unit.

Voice signals processed in the processor 180 can be output to the sound output unit 152. Additionally, voice signals processed in the processor 180 can be input to an external output device through the external device interface unit.

The processor 180 can determine at least one executable operation of the terminal 100 based on information determined or generated by using a data analysis algorithm or a machine learning algorithm. The processor 180 can control the components of the terminal 100 to execute the determined operation. To this end, the processor 180 can request, search, receive, or utilize data of the learning processor 130 or the memory 170, and control the components of the terminal 100 to execute the predicted operation or the operation determined to be desirable among the at least one executable operation.

When the connection of an external device is required to perform the determined operation, the processor 180 can generate a control signal for controlling the external device and can transmit the generated control signal to the external device.

The processor 180 can acquire intention information for the user input and can determine the user's requirements based on the acquired intention information.

The processor 180 can obtain intention information corresponding to a user input using at least one of a speech to text (STT) engine for converting a voice input into a character string or a natural language processing (NLP) engine for obtaining intention information of natural language. At least one of the STT engine or the NLP engine can be configured as an artificial neural network, at least part of which is learned according to the machine learning algorithm. At least one of the STT engine or the NLP engine can be learned by the learning processor 130, can be learned by the learning processor 240 of an artificial intelligence server, or can be learned by their distributed processing.

The processor 180 can collect history information including the operation contents of the terminal 100 or the user's feedback on the operation and can store the collected history information in the memory 170 or the learning processor 130 or transmit the collected history information to the external device such as the artificial intelligence server 200. The collected history information can be used to update the learning model.

The processor 180 can control at least part of the components of the terminal 100 to drive an application program stored in memory 170. Furthermore, the processor 180 can operate two or more of the components included in the terminal 100 in combination to drive the application program.

Meanwhile, the terminal 100 illustrated in FIG. 1 is merely an embodiment of the present disclosure, and some of the illustrated components can be integrated, added, or omitted according to the specifications of the terminal 100 that are actually implemented.

In an embodiment, two or more components of the terminal 100 can be combined into one component, or one component can be divided into two or more components as necessary. In addition, a function performed in each block is for describing an embodiment of the present disclosure, and its specific operation or device does not limit the scope of the present disclosure.

Figure 3:
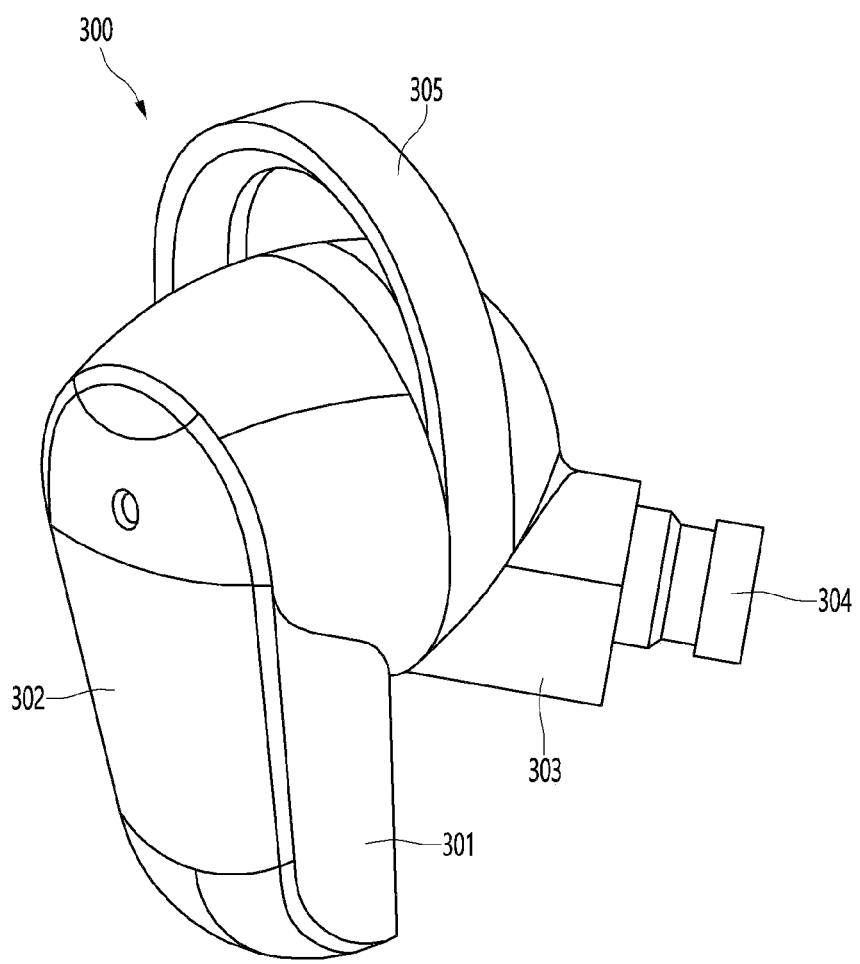
FIG. 3 is a perspective view of a wireless sound device according to an embodiment of the present disclosure.

FIG. 3 is a perspective view of a wireless sound device 300 according to an embodiment of the present disclosure.

Kernel-type wireless earphones as the wireless sound device 300 shown in FIG. 3 are merely an example, and the present disclosure is not limited thereto. That is, the wireless sound device 300 according to the present disclosure can include headphones, neckband-type earphones, kernel-type earphones, open-type earphones, bone conduction earphones, and the like.

Referring to FIG. 3, the wireless sound device 300 can include a plurality of case portions or cases 301, 302, 303, and 305, and the cases 301, 302, 303, and 305 are combined to form a housing including an inner space in which electronic components are mounted. A second case 302 coupled to one side of a first case 301 is a portion exposed to the outside when a user wears the wireless sound device 300, and a sound passage 304 that transmits sound to the user, at which a sound output unit 340 that outputs a sound according to sound signals is located, can be provided at the other side of the first case 301. In order to facilitate the mounting of parts (e.g., the sound output unit 340 and the communication unit 385) in the first case 301, a portion where the sound passage 304 is located is separated to form a separate case 303.

The wireless sound device 300 has the sound passage 304 protruding in a shape that can be inserted into the user's ear canal as a kernel-type, and an ear tip can be coupled to the outside of the sound passage 304 to be in close contact with the user's ear.

Figure 4:
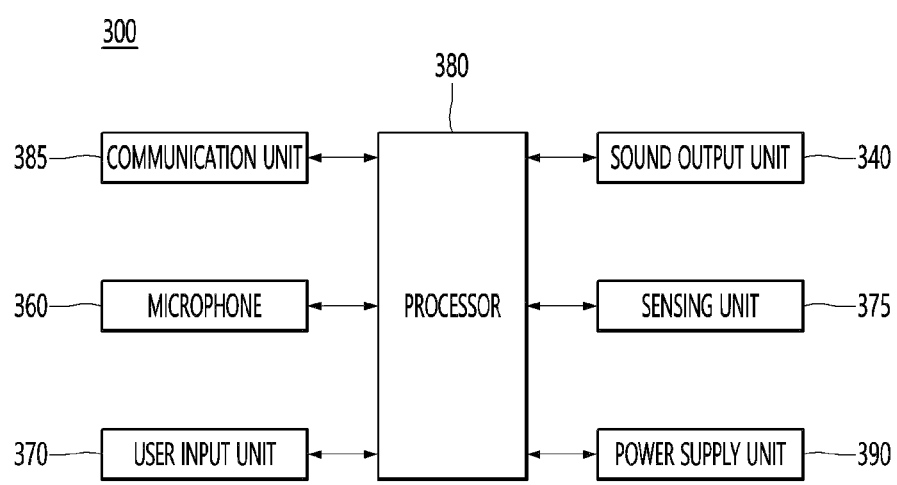
FIG. 4 is a block diagram illustrating a wireless sound device according to an embodiment of the present disclosure.

FIG. 4 is a block diagram illustrating a wireless sound device 300 according to an embodiment of the present disclosure.

Referring to FIG. 4, the wireless sound device 300 can include a processor 380, a communication unit 385, a sound output unit 340, a sensing unit 375, a microphone 360, a user input unit 370, a power supply unit 390 and the like.

The communication unit 385 can transmit/receive data to and from an external device, such as the terminal 100 using the wireless communication technology, and can include an antenna for transmitting/receiving a wireless signal. Since radiation performance is reduced when the antenna comes into contact with the user's body, the antenna can be positioned in the second case 302 that does not come into contact with the body when the user worn the wireless sound device 300.

The communication unit 385 can be disposed adjacent to the sound output unit 340. When the wireless sound device 300 includes a plurality of sound output units 340, the communication units 385 can be provided as many as the number of the sound output units 340, and disposed adjacent to the sound output units 340, respectively. For example, when the wireless sound device 300 includes a first sound output unit and a second sound output unit, a first communication unit can be disposed adjacent to the first sound output unit and a second communication unit can be disposed adjacent to the second sound output unit.

The sound output unit 340 can include a diaphragm, an acoustic coil, and a permanent magnet for forming a magnetic field around the acoustic coil. When power is applied to the acoustic coil, electromagnetic force is generated in the magnetic field formed by the permanent magnet to move the acoustic coil, so that the diaphragm vibrates according to the movement of the acoustic coil to output sound.

The microphone 360 processes negative acoustic signals as electrical voice data. The processed voice data can be transmitted to the terminal 100 or an external server through the communication unit 385. Various noise reduction algorithms can be implemented in the microphone 122 to remove noise occurring in the process of receiving an external sound signal (e.g., noise canceling earbuds or noise canceling headphones).

The user input unit 370 can mean an input unit or an input interface for allowing a user to control the wireless sound device 300. The wireless sound device 300 of a small size can be expanded to have inputtable control commands by combining the time and number of pressing buttons and a plurality of buttons using a touch method or using a limited number of buttons.

The sensing unit 375 can acquire information about the state of the wireless sound device 300 itself and surrounding conditions. The sensing unit 375 can include an illuminance sensor for detecting ambient brightness, a touch sensor for detecting a touch input, and a gyro sensor or an acceleration sensor for detecting the tilt and position of the wireless sound device 300.

The power supply unit 390 can supply power required for the processor 380 and components, and can include a battery. In addition, the power supply unit 390 can include a power terminal connected to an external power source to charge the battery. In an embodiment, the power terminal can be in contact with a power terminal formed on a cradle on which the wireless sound device 300 is mounted to receive power from the external power source.

The processor 380 can control the overall operation of the wireless sound device 300.

FIG. 5, including parts (a) and (b), is a diagram illustrating a method for collecting a user's spoken voice using a wireless sound device 300 according to various embodiments of the present disclosure.

In FIG. 5, part (a) shows an embodiment in which two microphones 361 and 362 are provided in the wireless sound device 300, and part (b) shows an embodiment in which three microphones 361 362, and 363 are provided in the wireless sound device 300.

Referring to FIG. 5, the microphone 360 of the wireless sound device 300 can include a plurality of microphones 361, 362, and 363.

The wireless sound device 300 can remove noise by combining sounds respectively obtained from the microphones 361, 362, and 363.

The wireless sound device 300 according to an embodiment includes two microphones 361 and 362 disposed at different positions, as shown in part (a) of FIG. 5, and each microphone (361, 362) to distinguish the user's spoken voice from an external noise by using the time difference, the volume difference, or the like of sounds collected, and thus remove the external noise (e.g., via destructive interference noise canceling).

As shown in part (b) of FIG. 5, the wireless sound device 300 according to another embodiment can additionally include a third microphone 363 that collects a sound transmitted through the Eustachian tube connecting the user's mouth and ears and remove the external noise by combining the sounds collected by the microphones 361 and 362 located outside and the third microphone 363. In particular, since the sound collected by the third microphone 363 has the external noise that is small and the user's spoken voice that is large, it is possible to provide an effective structure for removing external noise.

Figure 6:
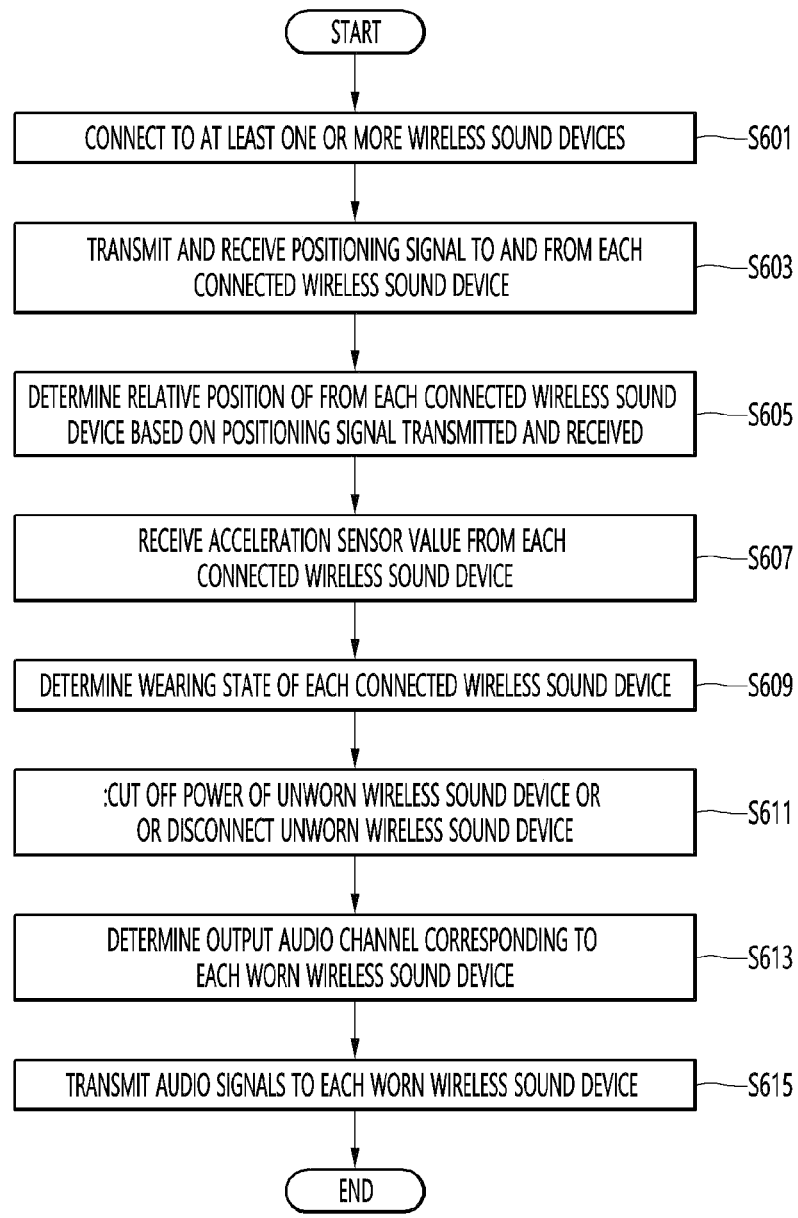
FIG. 6 is an operation flowchart illustrating a method for controlling a wireless sound device according to an embodiment of the present disclosure.

FIG. 6 is an operation flowchart illustrating a method for controlling a wireless sound device according to an embodiment of the present disclosure.

Referring to FIG. 6, the processor 180 of the terminal 100 is connected to at least one wireless sound device 300 through the communication unit 110 (S601).

The terminal 100 can be connected to one or more wireless sound devices 300 for outputting sound to output sound using the wireless sound device 300 connected later.

A wireless sound device, in which two sound output units are physically connected, such as a wireless headphone or a neckband-type earphone, can be regarded as a single wireless sound device 300 including a plurality of sound output units.

Two wireless sound devices physically separated from each other like Bluetooth earphones can be regarded as two wireless sound devices 300. In this situation, the two wireless sound devices 300 can be treated as one wireless sound device group in that the two wireless sound devices 300 operate together to output sound. The terminal 100 can connect to all the wireless sound devices 300 included in the wireless sound device group, or can connect only to a master wireless sound device in the wireless sound device group. The master wireless sound device is connected to the slave wireless sound devices in the wireless sound device group to which master wireless sound device belongs, and the terminal 100 can control the slave wireless sound device through the master wireless sound device.

Then, the processor 180 of the terminal 100 transmits and receives a positioning signal to and from the wireless sound device 300 connected through the communication unit 110 (S603).

The processor 180 can periodically transmit and receive a positioning signal to and from the wireless sound device 300 while the connection to the wireless sound device 300 is maintained. When the terminal 100 and the wireless sound device 300 transmit and receive a positioning signal to each other, it can mean exchanging a positioning signal.

The processor 180 can transmit a request signal to the wireless sound device 300 through the communication unit 110 for positioning of the wireless sound device 300, and receive a response signal corresponding to a request signal transmitted from the wireless sound device 300. The request signal transmitted from the terminal 100 to the wireless sound device 300 can be a poll message, and the response signal can be a response message.

Also, after receiving the response signal from the wireless sound device 300, the processor 180 can transmit a re-response signal to the wireless sound device 300 through the communication unit 110. The re-response signal transmitted from the terminal 100 to the wireless sound device 300 can be a final message.

The positioning signal can be transmitted through various communication technologies such as ultra-wideband (UWB), BLUETOOTH, and Wi-Fi.

Then, the processor 180 of the terminal 100 can determine a relative position of the wireless sound device 300 connected, based on the transmitted and received positioning signal (S605).

The processor 180 can determine the direction of the wireless sound device 300 based on an angle of arrival (AoA) of the transmitted and received positioning signal. In addition, the processor 180 can determine a distance to the wireless sound device 300 based on a Time of Flight (ToF) of the transmitted and received positioning signal. The direction of the wireless sound device 300 with respect to the terminal 100 and the distance to the wireless sound device 300 to the terminal 100 can be based on both relative positions of the wireless sound device 300.

The communication unit 110 of the terminal 100 can include a plurality of communication modules, the processor 180 can calculate an angle of arrival based on a phase difference or time difference between positioning signals received from the wireless sound device 300 using the plurality of communication modules.

Furthermore, the processor 180 can determine the relative position of the wireless sound device 300 based on at least one of the direction of the wireless sound device 300 and the distance to the wireless sound device 300.

The angle of arrival measured by the terminal 100 can vary depending on the posture of the terminal 100. Accordingly, the terminal 100 can acquire information on the posture of the terminal 100 through a gyro sensor value, and correct the angle of arrival for the connected wireless sound device 300 based on the acquired posture information. Alternatively, the terminal 100 can measure the angle of arrival only when the user directly controls the terminal 100. In this situation, it is possible to obtain the angle of arrival relatively accurately since the terminal 100 is in a position facing the user.

Then, the processor 180 of the terminal 100 can receive an acceleration sensor value from each connected wireless sound devices 300 through the communication units 110 (S607).

The acceleration sensor value can indicate the direction of gravity detected by the wireless sound device 300, which can be used to determine the posture of the wireless sound device 300. For example, when the wireless sound device 300 faces a direction horizontal to the ground, the acceleration sensor value can be +90 degrees or −90 degrees, and when the wireless sound device 300 faces the direction on the ground, the acceleration sensor, the acceleration sensor value can be can be 0 degrees.

Then, the processor 180 of the terminal 100 can determine the wearing state of each connected wireless sound device 300 based on the relative position and the acceleration sensor value of each connected wireless sound device 300 (S609).

The wireless sound device 300 can include the same number of communication units 385 as the sound output unit 340, and each communication unit 385 can be disposed in a position physically adjacent to each sound output unit 340. For example, each communication unit 385 can be disposed within a predetermined distance with respect to each sound output unit 340.

The wearing state of the wireless sound device 300 can include at least one of whether the wireless sound device 300 is worn or the direction in which the device 300 is worn. For example, the wearing state of the wireless sound device 300 can include information on whether the wireless sound device 300 is worn by one user or by multiple users, and in which direction the wireless sound device 300 is worn.

In order to determine whether or not the wireless sound device 300 is currently being worn by the user or the direction in which the device 300 is worn with high accuracy, a plurality of communication units 385 used for positioning the wireless sound devices 300 can be provided. That is, in a situation where the terminal 100 is connected to a single wireless sound device 300, when the wireless sound device 300 includes a plurality of communication units 385, it is possible to determine whether the wireless sound device 300 is being worn or not and/or the direction in which the device 300 is worn more accurately. In addition, since there are a plurality of communication units 385 included in each wireless sound device 300 when the terminal 100 is connected to a plurality of wireless sound devices 300 or a wireless sound device group, it is possible to determine whether the wireless sound device is being worn and/or the direction in which the device 300 is worn, more accurately.

Whether the wireless sound device 300 is worn can mean only whether the wireless sound device 300 is worn on or in the user's ear, furthermore, whether the wireless sound device 300 is worn by one user or worn by a plurality of users. That is, when the terminal 100 is connected to two wireless sound devices 300, both wireless sound devices 300 can be worn by only one user or can be worn by different users (e.g., two people sharing earbuds to listen to a same song or a same video), respectively. For identification, the processor 180 can determine whether the two wireless sound devices 300 are worn by one user based on the distance between the two wireless sound devices 300 and the directions in which the two wireless sound devices 300 are worn respectively. For example, when the distance between the two wireless sound devices 300 is within a reference range for a distance between the two ears, and the wearing directions of the two wireless sound devices 300 are the left and right ears, the processor 180 can determine that the two wireless sound devices 300 are worn by only one user.

In an embodiment, the processor 180 can determine whether the wireless sound device 300 is worn based on the distance to the wireless sound device 300. For example, when the distance to the wireless sound device 300 is greater than a first reference value, the processor 180 can determine that the user is not currently wearing the wireless sound device 300.

In an embodiment, the processor 180 can determine whether the two wireless sound devices 300 are being worn based on the distance between the two wireless sound devices 300 in a state in which two wireless sound devices 300 are connected to each other. To this end, the processor 180 can calculate a distance between the two wireless sound devices 300 based on the relative positions of the two wireless sound devices 300. For example, when the distance between the two wireless sound devices 300 is less than a second reference value, the processor 180 can determine that the user is not wearing the wireless sound devices 300.

In an embodiment, the processor 180 can determine the posture of the wireless sound device 300 based on acceleration sensor values of the wireless sound devices 300, and determine whether the wireless sound device 300 is being worn and a wearing direction of the wireless sound device 300 based on the posture of the wireless sound devices 300. For example, when the posture of the wireless sound device 300 is within a first reference angle range, the processor 180 can determine that the wireless sound device 300 is worn on the left ear, and when the posture of the wireless sound device 300 is within a second reference angle range, the processor 180 can determine that the wireless sound device 300 is worn on the right ear. When the posture of the wireless sound device 300 is outside the first reference angle range and the second reference angle range, the processor 180 can determine that the wireless sound device is not being worn by the user.

Then, when it is determined that a wireless sound device is not being worn, the processor 180 of the terminal 100 cuts off the power of the unworn wireless sound device 300 or disconnects the unworn wireless sound device 300 (S611).

The processor 180 cuts off power or disconnects the wireless sound device 300 determined not to be worn, thereby preventing the output of sound by the unworn wireless sound device 300 and unnecessary power consumption.

Then, the processor 180 of the terminal 100 can determine output audio channels respectively corresponding to the worn wireless sound devices 300 based on whether the wireless sound devices 300 are worn or not and the wearing directions of the wireless sound devices 300 (S613).

The sound output unit 340 of the wireless sound device 300 can have an audio channel set in advance, but the user can wear the wireless sound device 300 in a position different from the previously set direction (or channel). Accordingly, the processor 180 can determine audio output channels respectively corresponding to the worn wireless sound devices 300, based on whether each wireless sound device 300 is worn and the wearing direction of the wireless sound device 300 determined to be worn.

In an embodiment, when one wireless sound device 300 is being worn and the worn wireless sound device 300 includes two sound output units 340, the processor 180 can set the output audio channels for the two sound output units 340 can be set as a left channel or a right channel in consideration of the wearing direction of the worn wireless sound device 300. For example, the processor 180 can identify the two sound output units 340 as a left sound output unit and a right sound output unit in consideration of the wearing direction of the wireless sound device 300, determine the output audio channel of the left sound output unit as a left channel and the output audio channel of the right sound output unit as a right channel.

In an embodiment, when it is determined that the two wireless sound devices 300 are worn, the processor 180 can set an output audio channel for the sound output unit 300 of each wireless sound device 300 to a left channel, a right channel, or a mono channel in consideration of the wearing direction of each wireless sound device 300. For example, when the two wireless sound devices 300 are worn by one user, the processor 180 can identify the two wireless sound devices as a left wireless sound device and a right wireless sound device in consideration of the wearing direction of the wireless sound device 300 and determine the output audio channel of the sound output unit 340 of the left wireless sound device as the left channel and the output audio channel of the sound output unit 340 of the right wireless sound device as the right channel. Also, for example, when the two wireless sound devices 300 are not worn by one user, the processor 180 can determine the output audio channel of the sound output unit 340 of each wireless sound device 300 as a mono channel (e.g., when two users are sharing a set of earbud headphones). The reason for this is that if only the sound of one sound output unit 340 is transmitted to one person, outputting the sound of the mono channel enables provision of a sound with high satisfaction.

In an embodiment, when it is determined that only one wireless sound device 300 is worn, and only one sound output unit 340 is included in the worn wireless sound device 300, the processor 180 can determine an output audio channel of the sound output unit 340 of the worn wireless sound device 300 as a mono channel.

Then, the processor 180 of the terminal 100 can transmit an audio signal corresponding to the output audio channel determined for each worn wireless sound device 300 through the communication unit 110 (S615).

The audio signal is an audio signal corresponding to the output audio content.

Accordingly, the terminal 100 can control the operation of the wireless sound device 300 corresponding to the wearing state of the connected wireless sound device 300.

The order of the steps shown in FIG. 6 is only an example, and the present disclosure is not limited thereto. That is, according to an embodiment, the order of some of the steps shown in FIG. 6 can be reversed to be performed or performed according to a different ordering. In an embodiment, some of the steps shown in FIG. 6 can be performed in parallel. Further, only some of the steps shown in FIG. 6 can be performed.

Figure 7:
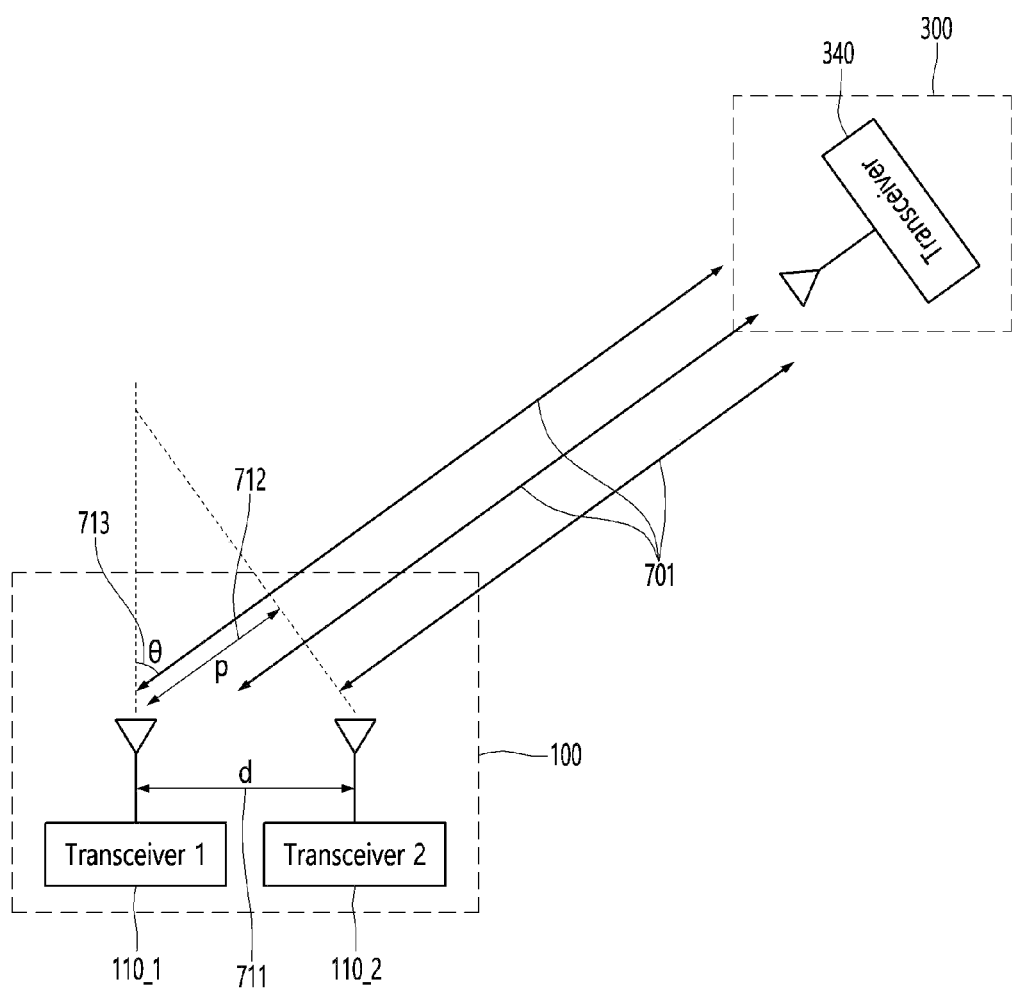
FIG. 7 is a diagram illustrating a method for measuring an angle of arrival in a terminal according to an embodiment of the present disclosure.

FIG. 7 is a diagram illustrating a method for measuring an angle of arrival in the terminal 100 according to an embodiment of the present disclosure.

Referring to FIG. 7, the communication unit 110 of the terminal 100 according to an embodiment of the present disclosure can include a first communication unit (first transceiver, 110_1) and a second communication unit (second transceiver, 110_2), and the terminal 100 can transmit/ receive a positioning signal 701 to and from the communication unit 340 of the wireless communication device 300 through the first communication unit 110_1 and the second communication unit 110_2.

The angle of arrival θ 713 of the positioning signal 710 for the terminal 100 can be defined as an angle between the normal of a line connecting the two communication units 110_1 and 110_2 of the terminal 100 and the positioning signal 710, and when the positioning signal 710 is incident in a direction perpendicular to the terminal 100, the angle of arrival 713 can be 0 degrees.

The processor 180 can calculate the angle of arrival θ 713 using a distance "d" 711 between the two communication units 110_1 and 110_2 of the terminal 100 and a distance difference "p" 712 between positioning signals 710 incident on the two communication units 110_1 and 110_2. Specifically, a phase difference α exists in the positioning signals 710 incident on the first communication unit 110_1 and the second communication unit 110_2, and the processor 180 can calculate the distance difference "p" 712 corresponding to a phase difference α using the wavelength λ of the positioning signal 710. That is, the processor 180 can calculate the angle of arrival θ 713 using the following [Equation 1] to [Equation 3].

$$\sin\theta = \frac{p}{d} \quad \text{[Equation 1]}$$

$$\frac{\alpha}{2\pi} = \frac{p}{\lambda} \quad \text{[Equation 2]}$$

$$\theta = \sin^{-1}\frac{\alpha\lambda}{2\pi d} \quad \text{[Equation 3]}$$

FIG. 7 merely shows an example of a method for calculating an angle of arrival in a two-dimensional plane using two communication units 110_1 and 110_2 included in the communication unit 110 of the terminal 100, and the present disclosure is not limited thereto. That is, in various embodiments of the present disclosure, the communication unit 110 of the terminal 100 can include two or more communication units, and the processor 180 can calculate an angle of arrival for each 3-dimensional axis using the two or more communication units to calculate the direction of the wireless sound device 300 in a three-dimensional space.

Figure 8:
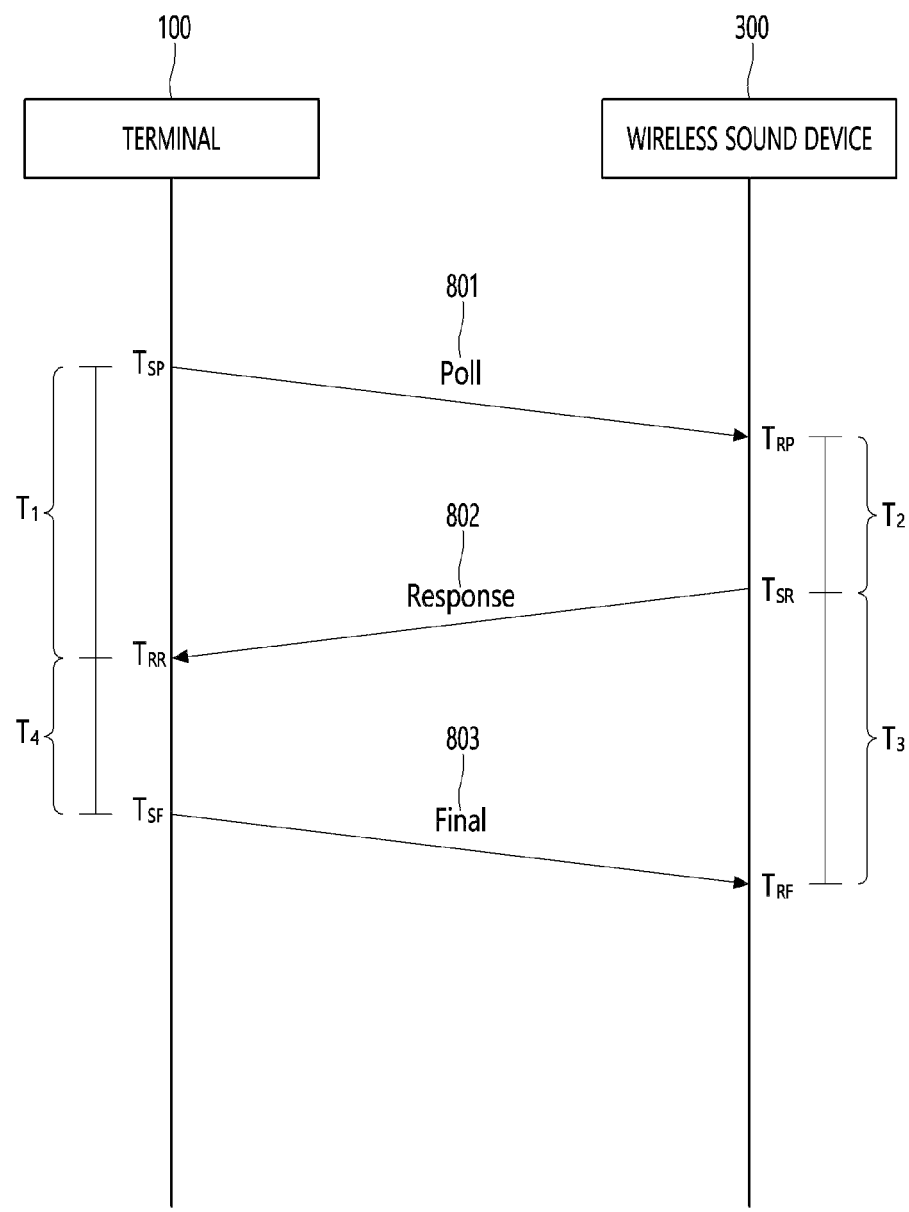
FIG. 8 is a diagram illustrating a method for measuring a distance from a terminal to a wireless sound device according to an embodiment of the present disclosure.

FIG. 8 is a diagram illustrating a method for measuring a distance from the terminal 100 to the wireless sound device 300 according to an embodiment of the present disclosure.

Referring to FIG. 8, the terminal 100 according to an embodiment of the present disclosure can measure a distance between the terminal 100 and the wireless sound device 300 using a two-way ranging technique.

The terminal 100 can transmit a poll message 801 to the wireless sound device 300 at time point $T_{SP}$, and the wireless sound device 300 can receive the poll message 801 at time point $T_{RP}$. Then, the wireless sound device 300 can transmit a response message 802 to the terminal 100 at time point $T_{SR}$, in response to the received poll message 801, and the terminal 100 can receive a response message 802 at time point $T_{RR}$. Then, the terminal 100 can transmit a final message 803 to the wireless sound device 300 at time point $T_{SF}$ in response to the received response message 802, and the wireless sound device 300 can receive the final message 803 at time point $T_{RF}$.

Since the terminal 100 transmits the poll message 801 at time point $T_{SP}$ and receives the response message 802 as a response to the poll message 801 at time point $T_{RR}$, it takes time $T_1$ to transmit a message and receive a response message in terms of the terminal 100. Since the wireless sound device 300 also receives the poll message 801 at time point $T_{RP}$ and transmits the response message 802 at time point $T_{SR}$, it takes time $T_2$ until the wireless sound device 300 makes a response.

In addition, since the wireless sound device 300 transmits the response message 802 at time point $T_{SR}$ and receives the final message 803 as a response to the response message 802 at time point $T_{RF}$, it takes time $T_3$ to transmit a message and receive a response in terms of the wireless sound device 300. Since the terminal 100 also receives the response message 802 at time point $T_{RR}$ and transmits the final message 803 at time point $T_{SF}$, it takes time $T_4$ until the terminal 100 makes a response.

The processor 180 of the terminal 100 can calculate the time of flight (TOF) of the positioning signal 801, 802 or 803 transmitted and received between the terminal 100 and the wireless sound device 300 as shown in [Equation 4] below.

$$\begin{aligned}TOF &= \frac{\{(T_1 - T_2) + (T_3 - T_4)\}}{4} \quad \text{[Equation 4]} \\ &= \frac{[\{(T_{RR} - T_{SP}) + (T_{SR} - T_{RP})\} + \{(T_{RF} - T_{SR}) - (T_{SF} - T_{RR})\}]}{4} \\ &= \frac{2T_{RR} - T_{SP} - 2T_{SR} + T_{RP} + T_{RF} - T_{SF}}{4}\end{aligned}$$

Then, the terminal 100 can calculate the time-of-flight (TOF) of the positioning signal 801, 802, or 803, and then calculate a distance between the terminal 100 and the wireless sound device 300 using a propagation speed of the signal. In this, the terminal 100 can determine how far away the wireless sound device 300 is located relative to the terminal 100.

FIG. 8 merely shows an example method for measuring a distance between the terminal 100 and the wireless sound device 300 using a two-way ranging technique, and the present disclosure is not limited thereto. That is, in various embodiments of the present disclosure, the terminal 100 can measure the distance between the terminal 100 and the wireless sound device 300 using a one-way ranging technique or the like.

FIG. 9 is a diagram illustrating a result of calculating the relative locations of two wireless sound devices 300 (e.g., left and right earbuds) using a terminal 100 according to an embodiment of the present disclosure.

Specifically, FIG. 9 shows a result obtained in a state in which two wireless sound devices 300 are connected to the terminal 100 and operate as one wireless sound device group, two wireless sound devices 300 are worn on both ears of one user, and two wireless sound devices 300 and the terminal 100 are about 60 cm apart. In FIG. 9, part (a) shows the relative position of a first wireless sound device worn on a user's left ear, and part (b) shows the relative position of a second wireless sound device worn on the user's right ear.

Referring to FIG. 9, part (a), the first wireless sound device worn on the user's left ear is about 57 cm away from the terminal 100, and located in a direction of −14 degrees indicating a left direction with respect to the terminal 100. On the other hand, referring to part (b) of FIG. 9, the second wireless sound device worn on the user's right ear is about 63 cm away from the terminal 100, and located in a direction of 15 degrees indicating a right direction with respect to the terminal 100.

As described above, the terminal 100 can calculate a distance and a direction with respect to the wireless sound device 300 for the terminal 100 by transmitting and receiving a positioning signal to and from the wireless sound device 300, and determine a relative position of the wireless sound device 300 with respect to the terminal 100 based on the distance and the direction. As the relative position of the wireless sound device 300 with respect to the terminal 100 is determined, the terminal 100 can determine whether the wireless sound device 300 is currently being worn by the user.

Figure 10:
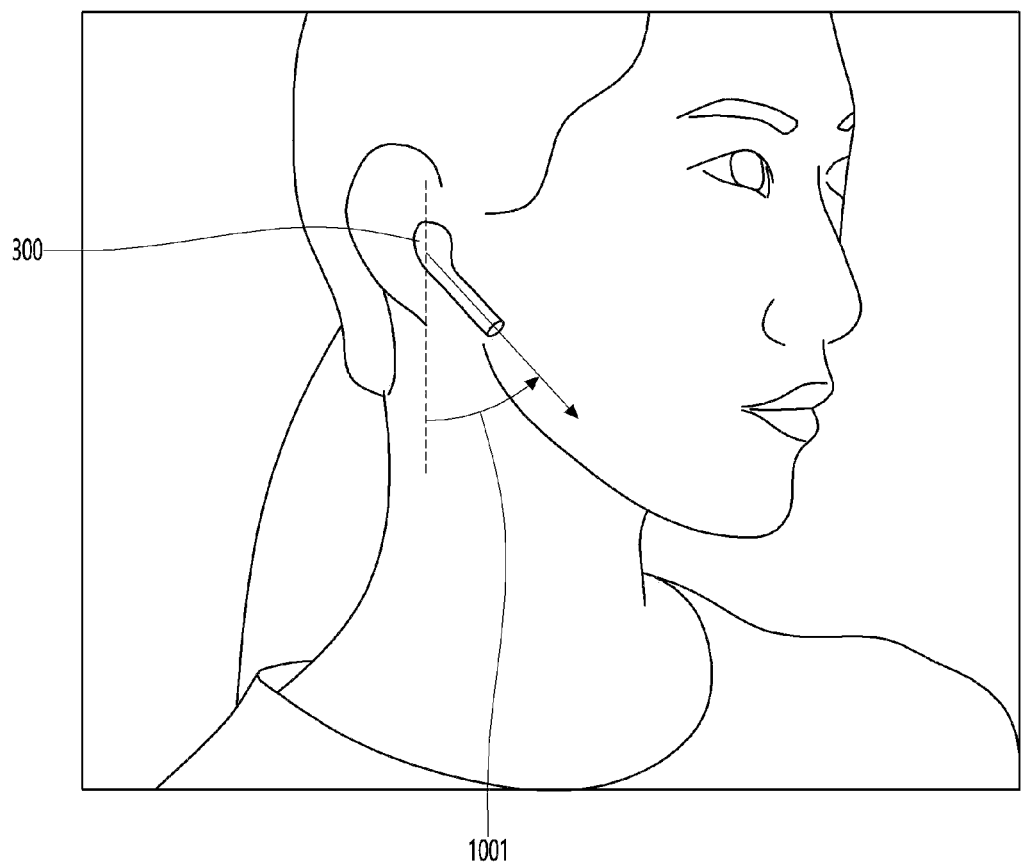
FIG. 10 is a diagram illustrating a posture of a wireless sound device according to an embodiment of the present disclosure.

FIG. 10 is a diagram illustrating a posture of the wireless sound device 300 according to an embodiment of the present disclosure.

Referring to FIG. 10, the posture of the wireless sound device 300 indicates the direction in which the wireless sound device 300 is arranged or pointing, and can be defined as an angle 1001 formed with a normal line of the ground.

The wireless sound device 300 includes a gyro sensor or an acceleration sensor, and the processor 180 of the terminal 100 can determine the posture of the wireless sound device 300 based on an acceleration sensor value received from the wireless sound device 300.

FIG. 11 is a diagram illustrating a posture of the wireless sound device 300 according to an embodiment of the present disclosure.

Referring to FIG. 11, when the wireless sound devices 300 are worn on both ears of a user, there is a difference in posture.

Referring to part (a) of FIG. 11, when the wireless sound device 300 is worn on the user's right ear, its posture has a positive angle in a counterclockwise direction from a normal to the ground. On the other hand, referring to part (b) of FIG. 11, when the wireless sound device 300 is worn on the user's left ear, its posture has a positive angle in a clockwise direction from a normal to the ground.

Accordingly, the processor 180 of the terminal 100 can identify an angle of the wireless sound device 300 with respect to the normal to the ground based on the acceleration sensor value received from the wireless sound device 300, and determine the posture of the wireless sound device 300 and on which ear the user wears the wireless sound device 300 based on the angle.

Figure 12:
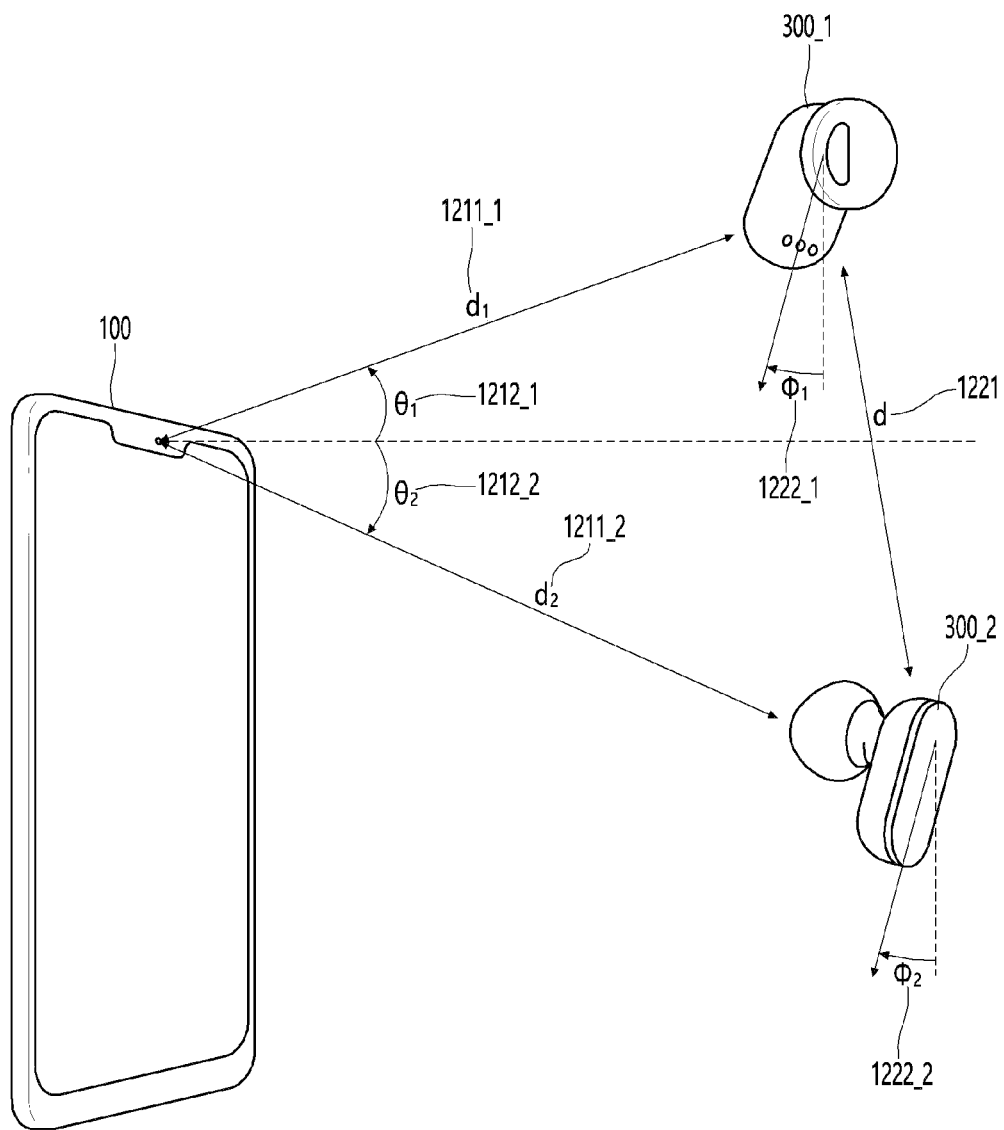
FIG. 12 is a diagram showing a relative location of a wireless sound device and a posture of the wireless sound device, with respect to a terminal, according to an embodiment of the present disclosure.

FIG. 12 is a diagram showing a relative location of a wireless sound device 300 and a posture of the wireless sound device 300, with respect to a terminal 100.

Referring to FIG. 12, the terminal 100 can connect to a first wireless sound device 300_1 and a second wireless sound device 300_2, and the first wireless sound device 300_1 and the second wireless sound device 300_2 can constitute one wireless sound device group (e.g., a set of earbuds). The first wireless sound device 300_1 can be a right wireless sound device to which a right channel is assigned as a default value, and the second wireless sound device 300_2 can be a left wireless sound device to which a left channel is assigned as a default value.

The terminal 100 can measure the distance $d_1$ 1211_1 to the first wireless sound device 300_1 and the direction $\theta_1$ 1212_1 of the first wireless sound device 300_1 by transmitting and receiving a positioning signal to and from the first wireless sound device 300_1. In addition, the terminal 100 can measure the distance $d_2$ 1211_2 to the second wireless sound device 300_2 and the direction $\theta_2$ 1212_2 of the second wireless sound device 300_2 by transmitting and receiving a positioning signal to and from the second wireless sound device 300_2. In FIG. 12, the direction $\theta_1$ 12121 of the first wireless sound device 300_1 with respect to the terminal 100 and the direction $\theta_2$ 1212_2 of the second wireless sound device 300_2 with respect to the terminal 100 can have the signs opposite to each other because the directions are opposite to each other with respect to a normal of the display of the terminal 100 (e.g., a positive sign and a negative sign). On the other hand, when the terminal 100 is not located between the first wireless sound device 300_1 and the second wireless sound device 300_2, the direction $\theta_1$ 1212_1 of the first wireless sound device 300_1 and the direction $\theta_2$ 1212_2 of the second wireless sound device 300_2 can have the same signs with respect to the terminal 100.

The terminal 100 can calculate the distance "d" 1221 between the first wireless sound device 300_1 and the second wireless sound device 300_2 using a distance $d_1$ 1211_1 to the first wireless sound device 300_1, a direction $\theta_1$ 1212_1 of the first wireless sound device 300_1, a distance $d_2$ 1211_2 to the second wireless sound device 300_2 and the direction $\theta_2$ 1212_2 of the second wireless sound device 300_2.

The first wireless sound device 300_1 can acquire a first acceleration sensor value (or gyro sensor value), and the first acceleration sensor value can represent the direction or posture $\varphi_1$ 1222_1 of the first wireless sound device 300_1 with respect to the ground direction. Further, the second wireless sound device 300_2 can acquire a second acceleration sensor value (or gyro sensor value), and the second acceleration sensor value can represent the direction or posture $\varphi_2$ 1222_2 of the second wireless sound device 300_2 with respect to the ground direction. The terminal 100 can acquire the posture $\varphi_1$ 1222_1 of the first wireless sound device 300_1 and the posture $\varphi_2$ 1222_2 of the second wireless sound device 300_2 by receiving the first acceleration sensor value from the first wireless sound device 300_1 and receiving the second acceleration sensor value from the second wireless sound device 300_2. Although it is shown in FIG. 12 that the posture $\varphi_1$ 1222_1 of the first wireless sound device 300_1 and the posture $\varphi_2$ 1222_2 of the second wireless sound device 300_2 are the same clockwise angle with respect to the ground direction, the posture $\varphi_1$ 1222_1 of the first wireless sound device 300_1 represents a clockwise direction with respect to the ground direction and the posture $\varphi_2$ 1222_2 of the second wireless sound device 300_2 represents a counterclockwise direction with respect to the ground direction. Accordingly, the posture $\varphi_1$ 1222_1 of the first wireless sound device 300_1 and the posture $\varphi_2$ 1222_2 of the second wireless sound device 300_2 can have opposite signs (e.g., one can have a positive sign, while the other has a negative sign).

The terminal 100 can determine whether the first wireless sound device 300_1 and the second wireless sound device 300_2 are currently being worn by the user and the wearing directions of the first wireless sound device 300_1 and the second wireless sound device 300_2, using the distance $d_1$ 1211_1 to the first wireless sound device 300_1, the direction $\theta_1$ 1212_1 of the first wireless sound device 300_1, the posture $\varphi_1$ 1222_1 of the first wireless sound device 300_1, the distance $d_2$ 1211_2 to the second wireless sound device 300_2, the direction $\theta_2$ 1212_2 of the second wireless sound device 300_2, the posture $\varphi_2$ 1222_2 of the second wireless sound device 300_2, and the distance "d" 1221 between the first wireless sound device 300_1 and the second wireless sound device 300_2.

Figure 13:
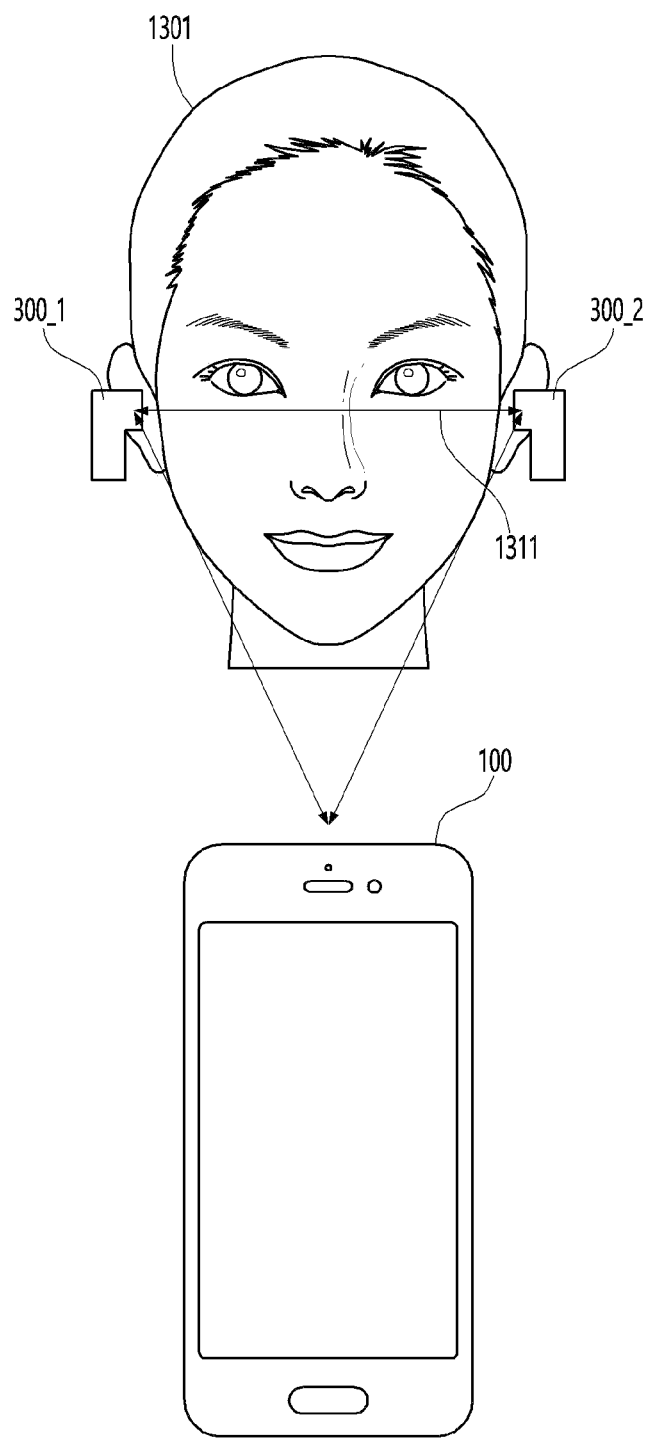
FIG. 13 is a diagram showing an example in which one user wears both wireless sound devices according to an embodiment of the present disclosure.

FIG. 13 is a diagram showing an example in which one user wears both wireless sound devices (e.g., one in each ear).

Referring to FIG. 13, two wireless sound devices 300_1 and 300_2 can constitute one wireless sound device group and can be worn by one user 1301. That is, the first wireless sound device 300_1 can be worn on the right ear of the user 1301, and the second wireless sound device 300_2 can be worn on the left ear of the user 1301.

The terminal 100 can acquire the distance, direction, and posture of each of the wireless sound devices 300_1 and 300_2, further acquire the distance 1311 between the two wireless sound devices 300_1 and 300_2, and determine whether the two wireless sound devices 300_1 and 300_2 are worn by one user using the acquired information. In particular, when the distance 1311 between the two wireless sound devices 300_1 and 300_2 is significantly farther or significantly closer than the distance between the two ears of a normal person, the terminal 100 can determine that the two wireless sound devices 300_1 and 300_2 are not being worn by one user.

The terminal 100 can determine that the two wireless sound devices 300_1 and 300_2 are worn by one user 1301 when the first wireless sound device 300_1 has a posture in the situation of being worn on the right ear, the second wireless sound device 300_2 has a posture in the situation of being worn on the left ear, the first wireless sound device 300_1 is located to the right side than the second wireless sound device 300_2 with respect to the terminal 100, and the distance between the first wireless sound device 300_1 and the second wireless sound device 300_2 falls within a predetermined ear-to-ear distance range. Accordingly, the terminal 100 can set the output audio channel of the first wireless sound device 300_1 to a right channel and set the output audio channel of the second wireless sound device 300_2 to a left channel.

Figure 14:
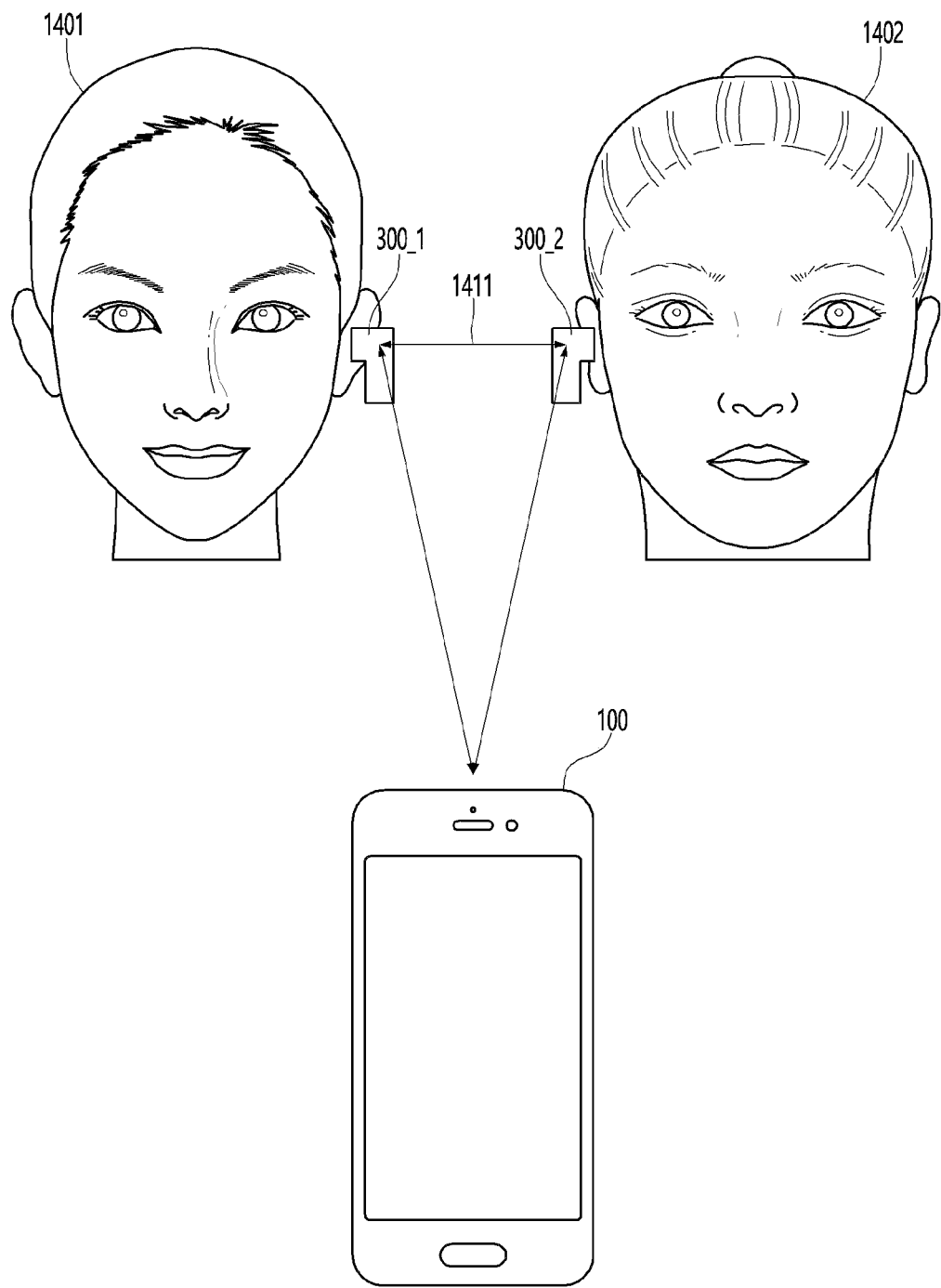
FIGS. 14 to 16 are diagrams illustrating examples in which two users wear two wireless sound devices respectively, according to embodiments of the present disclosure.
Figure 15:
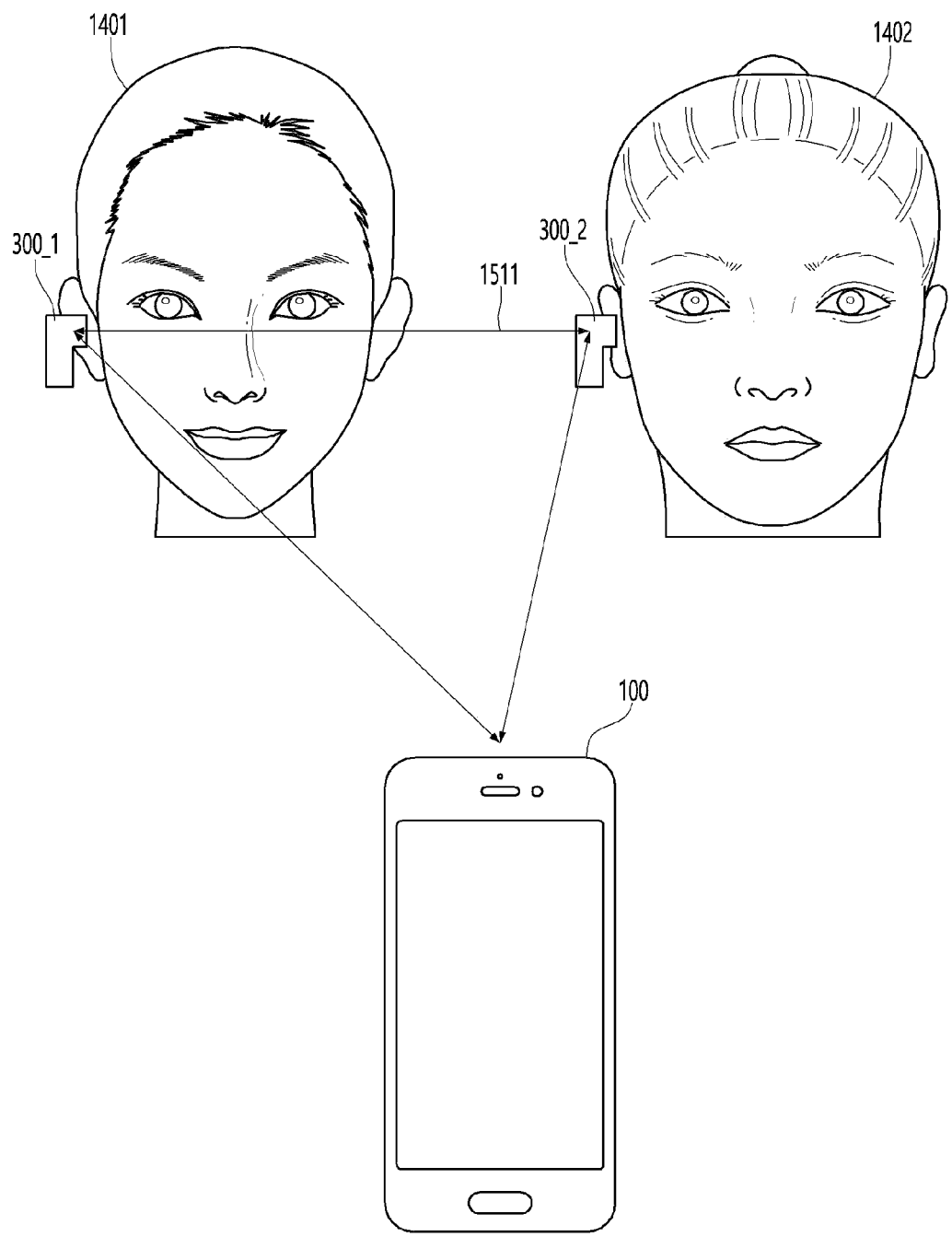
Figure 16:
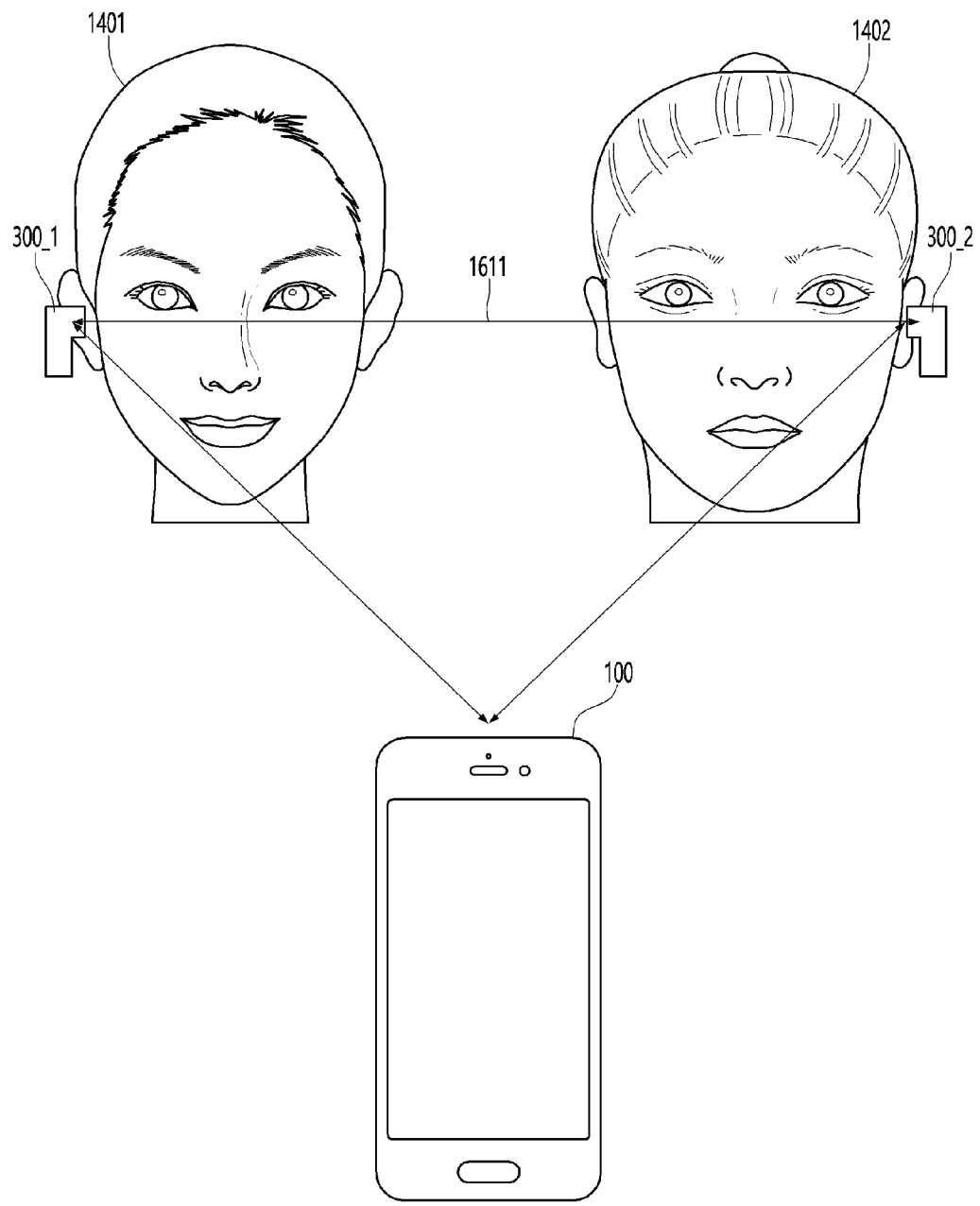

FIGS. 14 to 16 are diagrams illustrating examples in which two users wear two wireless sound devices respectively (e.g., when sharing a set of earbuds to listen to a same song or watch a same video).

In FIGS. 14 to 16, two wireless sound devices 300_1 and 300_2 can constitute one wireless sound device group, and can be worn by two users 1401 and 1402, respectively.

Referring to FIG. 14, the first wireless sound device 300_1 can be worn on the left ear of the first user 1401, and the second wireless sound device 300_2 can be worn on the right ear of the second user 1402. The terminal 100 can determine that the two wireless sound devices 300_1 and 300_2 are worn by two different users 1301 respectively when the first wireless sound device 300_1 has a posture in the situation of being worn on the left ear, the second wireless sound device 300_2 has a posture in the situation of being worn on the right ear, and the first wireless sound device 300_1 is located to the right side than the second wireless sound device 300_2 with respect to the terminal 100.

In particular, the terminal 100 can determine that the first wireless sound device 300_1 is worn on the left ear of the first user 1401 and the second wireless sound device 300_2 is worn on the right ear of the second user 1402 in consideration of the postures and directions of the two wireless sound devices 300_1 and 300_2 even when the distance 1411 between the first wireless sound device 300_1 and the second wireless sound device 300_2 falls within the predetermined ear-to-ear distance range (e.g., when the earbuds are facing away from each other even when being located near each other, rather than facing towards each other when being worn by a single user). Accordingly, the terminal 100 can determine both the output audio channels of the first wireless sound device 300_1 and the second wireless sound device 300_2 as mono channels so that each of the two users can better enjoy the audio content.

Referring to FIG. 15, the first wireless sound device 300_1 can be worn on the right ear of the first user 1401, and the second wireless sound device 300_2 can be worn on the right ear of the second user 1402. The terminal 100 can determine that the two wireless sound devices 300_1 and 300_2 are worn by two different users 1401 and 1402 respectively when the first wireless sound device 300_1 has a posture in the situation of being worn on the right ear, the second wireless sound device 300_2 also has a posture in the situation of being worn on the right ear, and the first wireless sound device 300_1 is located to the right side than the second wireless sound device 300_2 with respect to the terminal 100.

In addition, the distance 1511 between the first wireless sound device 300_1 and the second wireless sound device 300_2 is significantly out of the predetermined ear-to-ear distance range. In particular, the terminal 100 can determine that the first wireless sound device 300_1 is worn on the right ear of the first user 1401 and the second wireless sound device 300_2 is worn on the right ear of the second user 1402 in consideration of the postures and directions of the two wireless sound devices 300_1 and 300_2. Accordingly, the terminal 100 can determine both the output audio channels of the first wireless sound device 300_1 and the second wireless sound device 300_2 as mono channels.

Referring to FIG. 16, the first wireless sound device 300_1 can be worn on the left ear of the first user 1401, and the second wireless sound device 300_2 can be worn on the left ear of the second user 1402. The terminal 100 can identify that the first wireless sound device 300_1 has a posture in the situation of being worn on the left ear, the second wireless sound device 300_2 has a posture in the situation of being worn on the left ear, and the first wireless sound device 300_1 is located to the right side than the second wireless sound device 300_2 with respect to the terminal 100. However, it is difficult to determine whether the two wireless sound devices 300_1 and 300_2 are worn by only one user only with this information. Accordingly, the terminal 100 can identify the wearing states of the two wireless sound devices 300_1 and 300_2 by additionally considering the distance 1611 between the first wireless sound device 300_1 and the second wireless sound device 300_2.

The distance 1611 between the first wireless sound device 300_1 and the second wireless sound device 300_2 is more than twice a general ear-to-ear distance of a single person and deviates from the predetermined ear-to-ear distance range (e.g., most people's ears are spaced apart by a similar distance). Accordingly, the terminal 100 can determine that the first wireless sound device 300_1 is worn on the right ear of the first user 1401 and the second wireless sound device 300_2 is worn on the left ear of the second user 1402 in consideration of not only the postures and directions of the two wireless sound devices 300_1 and 300_2, but also the distance between the two wireless sound devices 300_1 and 300_2. Accordingly, the terminal 100 can determine both the output audio channels of the first wireless sound device 300_1 and the second wireless sound device 300_2 as mono channels so that both users can enjoy the same audio content while sharing a set of wireless sound devices.

Figure 17:
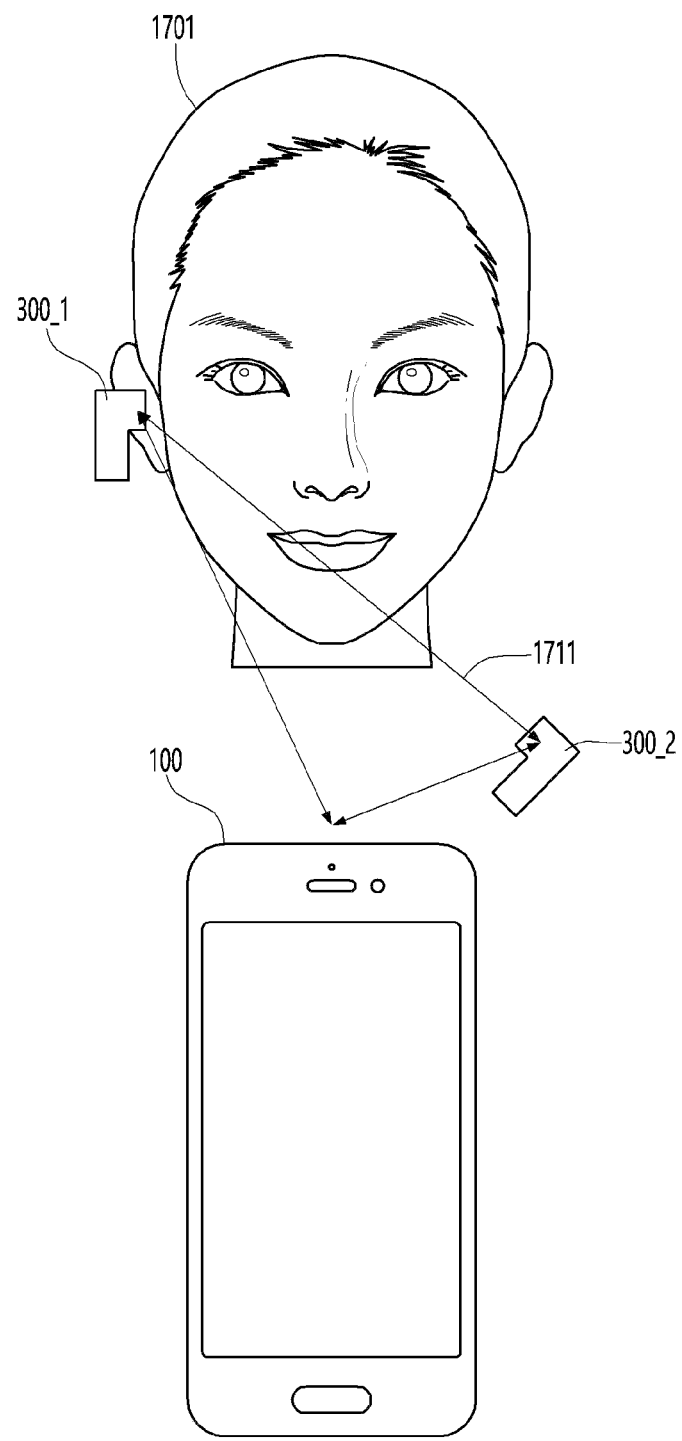
FIG. 17 is a diagram showing an example in which one user wears only one of two wireless sound devices according to an embodiment of the present disclosure.

FIG. 17 is a diagram showing an example in which one user wears only one of two wireless sound devices.

Referring to FIG. 17, two wireless sound devices 300_1 and 300_2 can constitute one wireless sound device group and only one of them can be worn by one user 1701. That is, the first wireless sound device 300_1 can be worn on the right ear of the user 1701, and the second wireless sound device 300_2 can not be worn on the user 1701 (e.g., in a situation where a user wants to enjoy audio content being played by the terminal 100, but also be able to hear the outside noises around her).

The terminal 100 can identify that the first wireless sound device 300_1 has a posture in the situation of being worn on the right ear, but the second wireless sound device 300_2 does not have a posture of being worn on the ear of the user 1701. In this situation, the distance 1711 between the first wireless sound device 300_1 and the second wireless sound device 300_2 is significantly outside of the predetermined ear-to-ear distance range. In particular, the terminal 100 can determine that the first wireless sound device 300_1 is worn on the right ear of the user 1701 and the second wireless sound device 300_2 is not being worn by the user 1701 in consideration of the postures and directions of the two wireless sound devices 300_1 and 300_2. Accordingly, the terminal 100 can set the output audio channel of the first wireless sound device 300_1 to a mono channel and cut off the power of the second wireless sound device 300_2, disconnect the second wireless sound device 300_2, or do not allocate an output audio channel to the second wireless sound device 300_2, in order to save power while also increasing the user's enjoyment of the audio being played by terminal 100.

Figure 18:
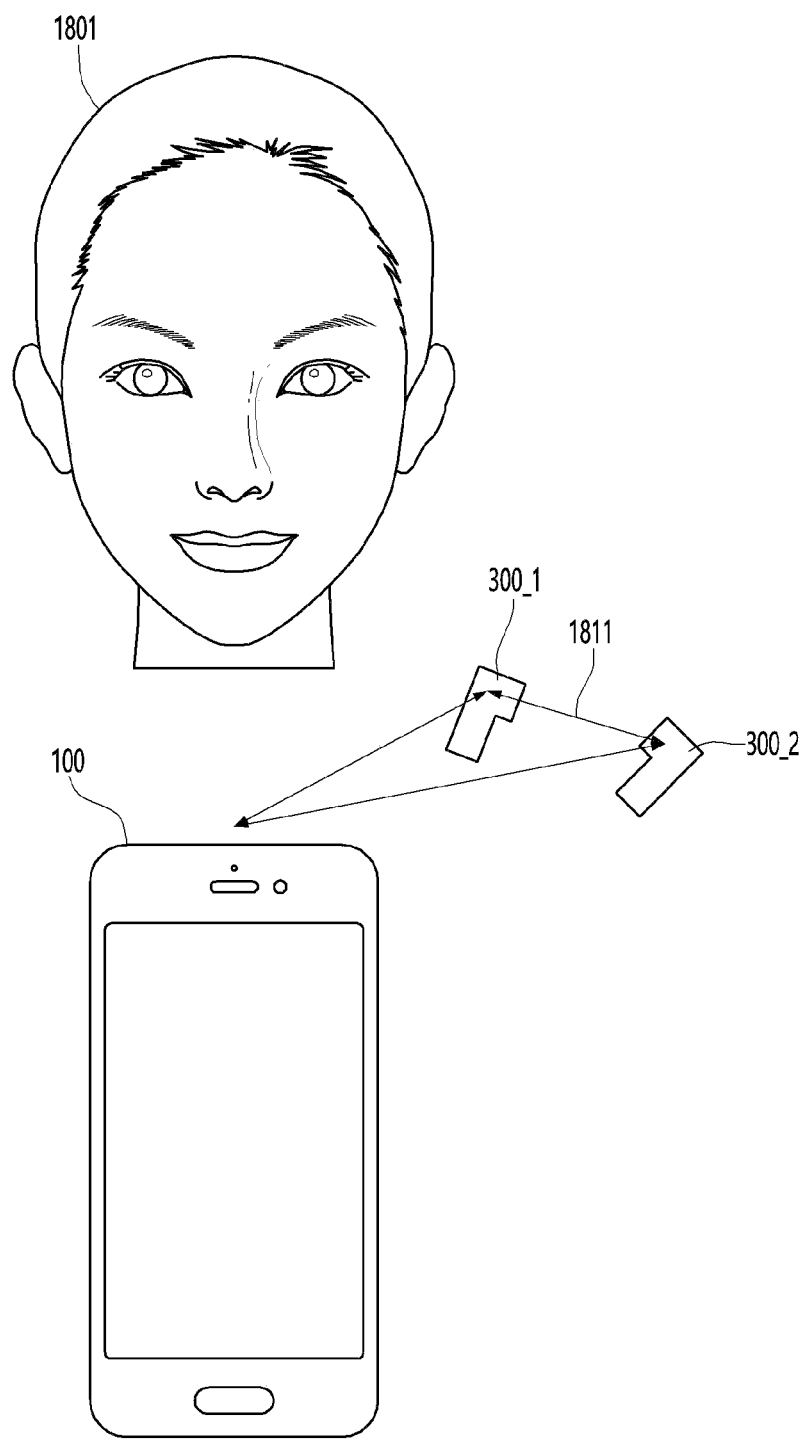
FIG. 18 is a diagram showing an example in which one user does not wear any two wireless sound devices according to an embodiment of the present disclosure.

FIG. 18 is a diagram showing an example in which one user does not wear any of the two wireless sound devices.

Referring to FIG. 18, two wireless sound devices 300_1 and 300_2 can constitute one wireless sound device group and can be worn on one user 1801. That is, the first wireless sound device 300_1 and the second wireless sound device 300_2 can not be worn on the user 1801.

The terminal 100 can identify that the first wireless sound device 300_1 and the second wireless sound device 300_2 do not have a posture of being worn on the ear of the user 1701. In this situation, the distance 1811 between the first wireless sound device 300_1 and the second wireless sound device 300_2 is significantly out of the predetermined ear-to-ear distance range because the first wireless sound device 300_1 and the second wireless sound device 300_2 are very close to each other. Accordingly, the terminal 100 can determine that the first wireless sound device 300_1 and the second wireless sound device 300_2 are not worn on the user 1801 in consideration of the postures and directions of the two wireless sound devices 300_1 and 300_2 and the distance between the two wireless sound devices 300_1 and 300_2. Accordingly, the terminal 100 can cut off the power of the first wireless sound device 300_1 and the second wireless sound device 300_2, disconnect the first wireless sound device 300_1 and the second wireless sound device 300_2, pause the audio content being played by terminal 100, or do not allocate output audio channels to the first wireless sound device 300_1 and the second wireless sound device 300_2.

Figure 19:
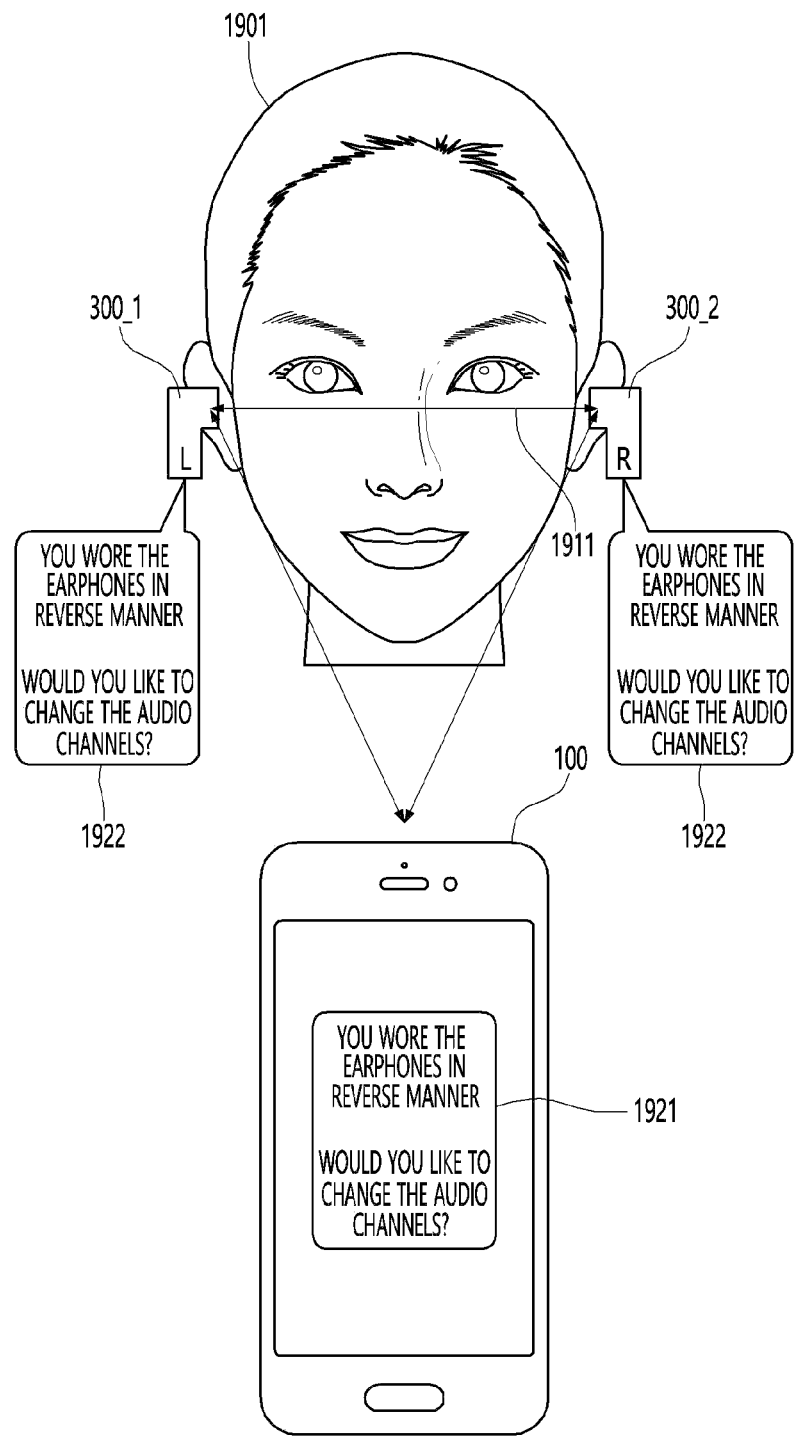
FIG. 19 is a diagram showing an example in which one user wears two wireless sound devices in reverse according to an embodiment of the present disclosure.

FIG. 19 is a diagram showing an example in which one user wears two wireless sound devices in reverse (e.g., a right earbud is in her left ear, and a left earbud is in her right ear).

Referring to FIG. 19, two wireless sound devices 300_1 and 300_2 can constitute one wireless sound device group and can be worn by one user 1901. That is, the first wireless sound device 300_1 can be worn on the right ear of the user 1901, and the second wireless sound device 300_2 can be worn on the left ear of the user 1901. However, the first wireless sound device 300_1 can have a left channel as an output audio channel set as a default value and a structure designed to be suitable for the shape of the left ear. Similarly, the second wireless sound device 300_2 can have a right channel as an output audio channel set as a default value and a structure designed to be suitable for the shape of the right ear. That is, the user 1901 is wearing both the wireless sound devices 300_1, in reverse manner relative to the designer's intention.

Through the above-described method, the terminal 100 can identify that the two wireless sound devices 300_1 and 300_2 are being worn in reverse manner to the designer's intention since the first wireless sound device 300_1 is worn on the right ear of the user 1901, and the second wireless sound device 300_2 is worn on the left ear of the user 1901. In this situation, the terminal 100 can change the output audio channel in consideration of the wearing directions of the two wireless sound devices 300_1, or can output notifications 1921 and 1922 for inducing correct wearing of the wireless sound devices.

The terminal 100 can output a notification such as "You wore the earphones in reverse manner. Would you like to change the audio channels'?" (1921) through the display unit 151, or output an audio notification such as "You wore the earphones in reverse manner. Would you like to change the audio channels'?" (1922). When the user 1901 requests to change the audio channels, the terminal 100 can set the output audio channel of the first wireless sound device 300_1 to a right channel and set the output audio channel of the second wireless sound device 300_2 to a left channel. On the other hand, when the user 1901 does not request to change the audio channels, the terminal 100 can not change the output audio channel set as a default value for each of the wireless sound devices 300_1 and 300_2.

The terminal 100 can periodically determine whether the user 1901 wears the wireless sound devices 300_1 and 300_2 in correct manner, and when it is determined that the wireless sound devices 300_1 and 300_2 are worn in reverse manner, output the notification 1921 and/or 1922 for inducing correct wearing of the wireless sound device. The notification for inducing correct wearing of the wireless sound device can include a notification indicating that the wireless sound device is worn in a wrong direction or a notification indicating that an output audio channel is set according to the wearing direction of the wireless sound device.

According to an embodiment of the present disclosure, the above-described method can be implemented with codes readable by a computer on a non-transitory computer readable medium in which a program is recorded. The computer-readable medium includes all kinds of recording devices in which data readable by a computer system is stored. Examples of the computer readable medium can include a hard disk drive (HDD), a solid state disk (SSD), a silicon disk drive (SDD), a ROM, a RAM, a CD-ROM, a magnetic tape, a floppy disk, an optical data storage device, and the like.

The invention claimed is:

1. A terminal for controlling a wireless sound device, the terminal comprising:
 a communication interface configured to wirelessly connect to at least one or more wireless sound devices; and
 a processor configured to:
  transmit and receive a positioning signal to and from the at least one or more wireless sound devices through the communication interface, determine a relative position of the at least one or more wireless sound devices based on the positioning signal, receive an acceleration sensor value from the at least one or more wireless sound devices through the communication interface, determine a posture of the at least one or more wireless sound devices based on the acceleration sensor value, determine a wearing state of the at least one or more wireless sound devices based on the relative position and the posture of the at least one or more wireless sound devices, and transmit an audio signal to a worn wireless sound device among the at least one or more wireless sound devices through the communication interface, wherein the relative position includes a distance to the at least one or more wireless sound devices and a direction of the at least one or more wireless sound devices with respect to the terminal, wherein the communication interface includes at least two or more communication transceivers, and wherein the processor is further configured to:
measure an angle of arrival (AoA) of the positioning signal using the at least two or more communication transceivers,
measure a time of flight (ToF) of the positioning signal, and
determine the relative position of the at least one or more wireless sound devices based on the AoA and the ToF.

2. The terminal of claim 1, wherein the processor is further configured to calculate the distance to the at least one or more wireless sound devices using a two-way ranging technology.

3. The terminal of claim 1, wherein the relative position includes a distance between a plurality of wireless sound devices when the at least one or more wireless sound devices includes the plurality of wireless sound devices, and
wherein the processor is further configured to calculate the distance between the plurality of wireless sound devices based on a direction and a distance of each of the plurality of wireless sound devices.

4. The terminal of claim 3, wherein the processor is configured to determine the wearing state of the at least one or more wireless sound devices based on at least one of the distance to each of the plurality of wireless sound devices, the direction of each of the plurality of wireless sound devices, the posture of each of the plurality of wireless sound devices, or the distance between the plurality of wireless sound devices.

5. The terminal of claim 3, wherein the wearing state includes at least one of whether the at least one or more wireless sound devices is currently being worn by a user or a wearing direction of the at least one or more wireless sound devices.

6. The terminal of claim 5, wherein the processor is further configured to cut off power to an unworn wireless sound device among the at least one or more wireless sound devices, disconnect the unworn wireless sound device, or prevent an output audio channel from being assigned or supplied to the unworn wireless sound device.

7. The terminal of claim 5, wherein the processor is further configured to:
determine an output audio channel corresponding to a worn wireless sound device among the at least one or more wireless sound devices that is currently being worn by the user based on a wearing direction of the worn wireless sound device, and
transmit an audio signal corresponding to the output audio channel to the worn wireless sound device.

8. The terminal of claim 1, wherein the communication interface is configured to wirelessly connect to a first wireless sound device and a second wireless sound device, and
wherein the processor is further configured to determine wearing states of the first wireless sound device and the second wireless sound device based on at least one of a direction of the first wireless sound device, a posture of the first wireless sound device, a direction of the second wireless sound device, a posture of the second wireless sound device, and a distance between the first wireless sound device and the second wireless sound device.

9. The terminal of claim 8, wherein the processor is further configured to:
in response to determining that both of the first wireless sound device and the second wireless sound device are being worn by a same user, set a first output audio channel of the first wireless sound device based on a wearing direction of the first wireless sound device and set a second output audio channel of the second wireless sound device based on a wearing direction of the second wireless sound device.

10. The terminal of claim 8, wherein the processor is further configured to:
in response to determining that the first wireless sound device and the second wireless sound device are being worn by a same user in opposite directions to default wearing directions, transmit a notification guiding correct wearing to at least one or more of the first wireless sound device and the second wireless sound device through the communication interface.

11. The terminal of claim 8, wherein the processor is further configured to:
in response to determining that each of the first wireless sound device and the second wireless sound device is being worn by a different user among two users or in response to determining that only one of the first wireless sound device and the second wireless sound device is being worn by one user, set an output audio channel of a worn wireless sound device among the first wireless sound device and the second wireless sound device as a mono channel.

12. The terminal of claim 1, wherein the processor is further configured to:
determine that a first corresponding wireless sound device is worn on a left ear when a posture of the first corresponding wireless sound device is within a first reference angle range, and
determine that a second corresponding wireless sound device is worn on a right ear when a posture of the second corresponding wireless sound device is within a second reference angle range.

13. A method for controlling a terminal to control a wireless sound device, the method comprising:
wirelessly connecting the terminal to at least one or more wireless sound devices;
transmitting and receiving, via a communication interface in the terminal, a positioning signal to and from the at least one or more wireless sound devices;
determining, by a processor in the terminal, a relative position of the at least one or more wireless sound devices based on the positioning signal;

determining a wearing state of the at least one or more wireless sound devices based on the relative position; and transmitting an audio signal to a worn wireless sound device among the at least one or more wireless sound devices through the communication interface, wherein the relative position includes a distance to the at least one or more wireless sound devices and a direction of the at least one or more wireless sound devices with respect to the terminal, wherein the communication interface includes at least two or more communication transceivers, and wherein the determining the relative position of the at least one or more wireless sound devices includes:

measuring an angle of arrival (AoA) of the positioning signal using the at least two or more communication transceivers, measuring a time of flight (ToF) of the positioning signal, and determining the relative position of the at least one or more wireless sound devices based on the AoA and the ToF.

14. The method of claim 13, further comprising:

determining, by the processor, a posture of the at least one or more wireless sound devices based on an acceleration sensor value received from the at least one or more wireless sound devices or based on the positioning signal, wherein the wearing state is determined based on both of the relative position and the posture.

15. The method of claim 13, further comprising:

wirelessly connecting the terminal to a first wireless sound device and a second wireless sound device among the at least one or more wireless sound devices;

determining, by the processor, a first wearing state of the first wireless sound device based on at least one of a first direction of the first wireless sound device, a first posture of the first wireless sound device, and a distance between the first wireless sound device and the second wireless sound device; and determining, by the processor, a second wearing state of the second wireless sound device based on at least one of a second direction of the second wireless sound device, a second posture of the second wireless sound device, and the distance between the first wireless sound device and the second wireless sound device.

16. The method of claim 15, further comprising:

in response to determining that only one of the first and second wireless sound devices is being worn or in response to determining that the first wireless sound device is being worn by a first user and the second wireless sound device is being worn by a second user different than the first user, transmitting mono audio content to one or more of the first and second wireless sound devices.

17. The method of claim 15, further comprising:

in response to determining that only one of the first and second wireless sound devices is being worn, turning off an unworn wireless sound device among the first and second wireless sound devices sound devices, disconnecting the unworn wireless sound device from the terminal, or preventing an output audio channel from being assigned or supplied to the unworn wireless sound device.

18. The method of claim 15, further comprising:

in response to determining that the first wireless sound device and the second wireless sound device are being worn by a same user in opposite directions relative to default wearing directions of the first and second wireless sound devices, transmitting a notification guiding correct wearing to at least one or more of the first and second wireless sound devices, or displaying a guide message on a display of the terminal for guiding correct wearing.

* * * * *